(12) United States Patent
Kunst et al.

(10) Patent No.: US 8,149,191 B2
(45) Date of Patent: Apr. 3, 2012

(54) SEQUENTIAL CALIBRATION OF MATCHED CURRENT SOURCES

(75) Inventors: David J. Kunst, Cupertino, CA (US); Steven Huynh, Sunnyvale, CA (US); Richard L. Gray, Saratoga, CA (US)

(73) Assignee: Active-Semi, Inc. (VG)

( * ) Notice: Subject to any disclaimer, the term of this patent is extended or adjusted under 35 U.S.C. 154(b) by 1300 days.

(21) Appl. No.: 11/824,269

(22) Filed: Jun. 29, 2007

(65) Prior Publication Data
US 2008/0284408 A1    Nov. 20, 2008

Related U.S. Application Data

(60) Provisional application No. 60/930,776, filed on May 17, 2007.

(51) Int. Cl.
*G09G 3/32* (2006.01)
(52) U.S. Cl. ............................ 345/82; 323/318; 323/351
(58) Field of Classification Search .............. 345/80–83, 345/39, 44; 250/552
See application file for complete search history.

(56) References Cited

U.S. PATENT DOCUMENTS

| | | | |
|---|---|---|---|
| 2003/0038617 A1* | 2/2003 | Yaklin | 323/304 |
| 2006/0191178 A1* | 8/2006 | Sempel et al. | 40/541 |

* cited by examiner

*Primary Examiner* — Kevin M Nguyen
*Assistant Examiner* — Kenneth B Lee, Jr.
(74) *Attorney, Agent, or Firm* — Imperium Patent Works; T. Lester Wallace; Darien K. Wallace

(57) ABSTRACT

A system involves LED strings and programmable current source circuits (CSC). An LED current flows through each LED string. Each LED current is controlled by an associated programmable CSC. In one embodiment, the CSCs form a chain. A first CSC uses a reference current for calibration, and thereafter supplies the reference current to the next CSC. When the next CSC detects the reference current, it uses the reference current for calibration. CSCs are calibrated one by one down the chain. In a second embodiment, each CSC can receive the reference current from a common conductor. If the common conductor is detected to be available, then the CSC uses the reference current for calibration. When the conductor is in use, the other CSCs detect the conductor as unavailable and do not attempt to self-calibrate. The CSCs use the reference current one by one, but in an order that changes over time.

20 Claims, 21 Drawing Sheets $R_{EXT1} = R_{EXT2} = R_{EXT3}$

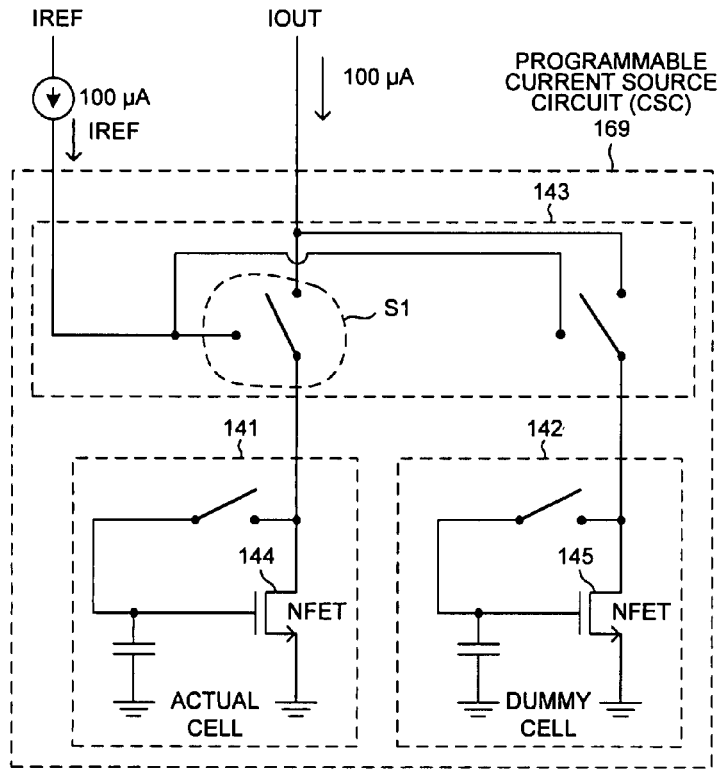
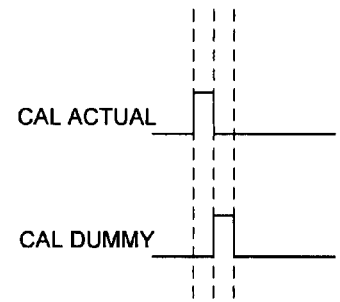
FIG. 11
FIG. 14
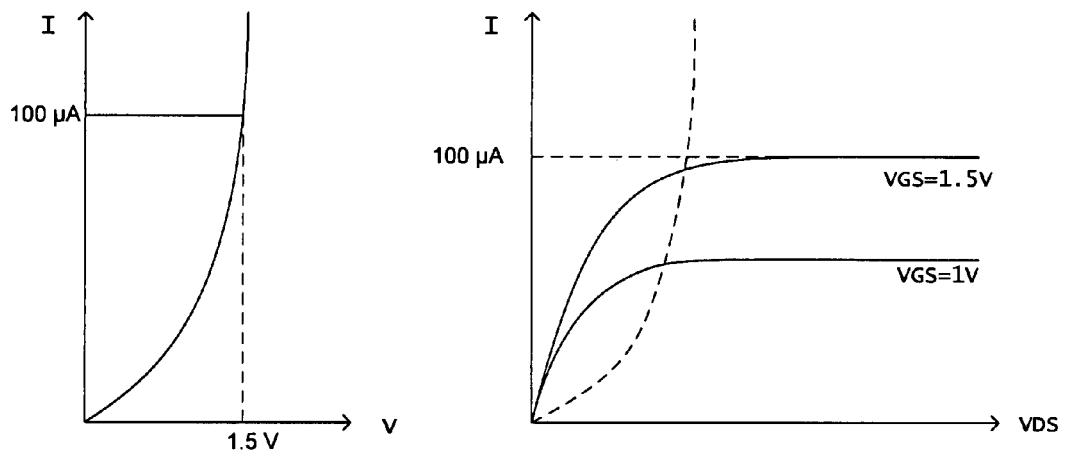
FIG. 12
FIG. 13

FLOW CHART FOR MASTER WLED DRIVER

US 8,149,191 B2

SEQUENTIAL CALIBRATION OF MATCHED CURRENT SOURCES

CROSS-REFERENCE TO RELATED APPLICATIONS

This application claims the benefit under 35 U.S.C. §119 of provisional application Ser. No. 60/930,776, entitled "Sequential Calibration Of Matched Current Sources", filed May 17, 2007. The subject matter of provisional application Ser. No. 60/930,776 is incorporated herein by reference.

TECHNICAL FIELD

The present disclosure relates generally to the calibrating of current flows through a plurality of current sources, and more particularly, to calibrating current flows where those current flows pass through strings of White Light Emitting Diodes (WLEDs) used for display backlighting.

BACKGROUND INFORMATION

Recent advances in WLED technology (White Light Emitting Diode) have made large arrays of WLEDs cost effective for backlighting applications in LCD screens for notebook computers, personal digital assistants, and flat panel televisions. There are applications now that already require hundreds of WLEDs and it is likely that thousands of WLEDs will be employed in future applications.

These large arrays often involve parallel connections of series strings of WLEDs. For instance a typical array might have twelve parallel strings where each string has ten WLEDs in series for a total number of one hundred twenty WLEDs.

FIG. 1 (Prior Art) is a diagram of an LCD display 1 that employs twelve strings of WLEDs for backlighting. The forward voltage drop across a WLED is typically from two to four volts. The forward current through a WLED can vary over several orders of magnitude but for many WLED arrays used for personal portable electronics a forward current of ten to one hundred milliamperes is common. To a first order the brightness of a WLED is proportional to the current passing through it. In order to provide constant brightness across a large array of WLEDs, the current through each string of WLEDs should be well matched to the other strings in the same array. Typical requirements for current matching are less than two percent over the whole array.

FIG. 2 (Prior Art) shows one way of providing current matching between multiple strings of WLEDs. In LCD display 2, the number of WLED strings is cut down to one and the current is run through the one long string of WLEDs. In theory, this gives the perfect current matching because exactly the same current flows through all the WLEDs (neglecting leakages and other second order effects). However, as array sizes increase and the subsequent number of WLEDs increases into the hundreds, the voltage V+ required to forward bias the LEDs becomes quite high. Providing this high voltage V+ requires specialized circuitry and creates new problems due to leakages. Accordingly, for practical applications, a parallel combination of multiple strings of WLEDs is advantageous. This necessitates that each string has a current control element in order that the current will match from string to string.

FIG. 3 (Prior Art) is a diagram that illustrates an array 3 of four strings 8-11 of WLEDs that are controlled by four corresponding respective current sources 4-7. An integrated circuit solution may include four to eight such current sources on one integrated circuit die. In FIG. 3, the current sources 4-7 are disposed on one integrated circuit die 12. If larger numbers of WLED strings are required, however, then such multiple integrated circuits may be used.

FIG. 4 (Prior Art) illustrates one problem with providing multiple such integrated circuits 13-15 to control a corresponding large number of WLED strings. The problem is that a current reference of one integrated circuit 13 may not match a current reference of another integrated circuit 15 used in the same large array. If there is a mismatch between the current references of the two integrated circuits, then there will also be a mismatch between the current flow through different WLED strings in the strings of WLEDs in the same LCD display. That will cause a brightness mismatch across the LCD display that might be detectable to the human eye and therefore unacceptable to humans who are considering purchasing the display. This is undesirable.

Techniques are known for making on-chip current references more accurate. These techniques usually involve some type of trimming in order provide the tight control necessary for these applications.

FIG. 5 (Prior Art) is a diagram that illustrates one such technique employing resistor trimming. To make all the currents I1-IN identical that flow into integrated circuit 16, the resistors 17-19 are trimmed. In one example, a "thin film resistor" layer is added to the integrated circuit to provide the low temperature coefficient and trimmability required. Any form of trimming, whether it be laser trimming or blowing fuse links on the integrated circuit or some other way trimming, will increase the cost of the integrated circuit.

FIG. 6 (Prior Art) illustrates another technique for providing precisely controlled current sources between multiple integrated circuits. This technique involves requiring each of the integrated circuits to have an associated highly accurate external resistor and an accurate internal voltage source. In the illustration of FIG. 6, integrated circuit 20 has an accurate internal voltage source 21 and an external precision resistor 22, and integrated circuit 23 has an accurate internal voltage source 24 and an external precision resistor 25. Drawbacks to this technique include the added cost of the external resistors, the variation and mismatch of the external resistors, and variations of the internal voltage sources. Providing the internal voltage sources with adequate precision generally requires some form of trimming. Moreover, voltage drops across the common ground line 26 may also lead to more current mismatch between multiple integrated circuits.

FIG. 7 (Prior Art) illustrates a further extrapolation of these potential solutions. The voltage reference is produced by only one circuit 27 and is bussed to all the integrated circuits 28-30. Each integrated circuit 28-30 has its associated accurate external resistor 31-33 as in the circuit of FIG. 6. The circuit of FIG. 7 has problems because voltage drops along the ground line 34 of a large LCD display would effectively change the reference voltage that each integrated circuit "sees" as one moves along the ground line 34 from integrated circuit to integrated circuit.

SUMMARY

A system and method involves a plurality of strings of light emitting diodes (LED), and a plurality of programmable current source circuits (CSC). A different LED current IOUT flows through each of the LED strings. Each of these LED currents IOUT is controlled by and flows through a respective associated one of the programmable CSCs. A first set of the programmable CSC is part of a first integrated circuit, whereas a second set of the programmable CSCs is part of a second integrated circuit. In one embodiment, the LEDs are White Light Emitting Diodes (WLED) that backlight a display such as an Liquid Crystal Display (LCD) display. The physical locations of the integrated circuits may be distributed over the large area of the plane of the LCD display.

In the system, each CSC is calibrated using a single reference signal (for example, a reference current signal) so that the LED current controlled by the CSC circuit is calibrated (i.e., programmed) to be the same as, or a function of or multiple of, the reference current. The CSCs are automatically calibrated one by one in this way, so that all of the LED currents are made to be of substantially identical magnitudes. When one of the CSCs is being calibrated using the reference signal, none of the other CSCs is being calibrated and none of the other CSCs is using the reference signal. The CSCs are calibrated sequentially, one at a time, and repeatedly, and automatically, so that all the LED currents that flow through the various LED strings remain substantially constant. (The term "sequential" here means one at a time, and can include a fixed order, or a changing order.)

In one example, the CSCs are organized in a chain such that a reference signal path passes into a first terminal of one of the first integrated circuits, passes through a chain of CSCs in the first integrated circuit, passes out of a second terminal of the first integrated circuit, then passes into a first terminal of a second integrated circuit, passes through a chain of CSCs in the second integrated circuit, and passes out of a second terminal of the second integrated circuit, and so forth. The reference signal is a reference current. The reference current is supplied onto the first terminal of the first integrated circuit. The first CSC in the chain of CSCs in the first integrated circuit couples itself into the signal path and uses the reference current to calibrate itself. The signal path to subsequent CSCs is broken. When the first CSC has been calibrated, the first CSC supplies the reference current down the signal path to the second CSC in the chain of CSCs in the first integrated circuit.

Each CSC has a detection circuit that determines whether the reference current is being supplied to it. The second CSC therefore determines that it is now being supplied with the reference current, and in response the second CSC couples itself into the signal path and uses the reference current to calibrate itself. When the second CSC is being calibrated, the signal path from the second CSC to subsequent CSCs in the chain is broken. When the second CSC has been calibrated, the process repeats. The second CSC forwards the reference current down the signal path to the next CSC in the chain. The reference current is now supplied to the third CSC in the chain through the first and second CSCs. Accordingly, the CSCs of the chain are calibrated automatically, one by one down the chain, through the various integrated circuits in which the various CSCs are disposed. Once all the CSCs in the chain have been calibrated to the reference current, the process repeats with the first CSC of the chain using the reference current to calibrate itself again. The order of calibration is the same each time the chain of CSCs is calibrated.

In a second example, the reference signal (in this case, a reference current) is not forwarded by the various CSCs to subsequent CSCs in a chain of CSCs, rather each CSC has only a single node or single terminal that is coupled to a common reference current conductor. If none of the CSCs is using the reference current from the conductor for calibration, then a voltage on the reference current conductor has a predetermined characteristic. If a CSC monitoring the reference current conductor through its single node determines that the voltage on the reference current conductor has the predetermined characteristic at a particular time, then the CSC uses the reference current from the conductor to calibrate itself. When the CSC is calibrating itself, the CSC causes the voltage on the reference current conductor not to have the predetermined characteristic so that other CSCs coupled to the conductor do not simultaneously calibrate themselves. In one example, each individual CSC determines the particular time at which the CSC will attempt to calibrate itself (the CSC will decide to initiate self-calibration only if the voltage on the reference current conductor has the predetermined characteristic). Because the timers of the various CSCs are not synchronized to one another, the order in which the CSCs check the reference current conductor to determine if it is available varies over time. Accordingly, the order in which the CSCs self-calibrate varies over time.

In a third example, the reference signal (in this case, a reference current) is not forwarded by the various CSCs to subsequent CSCs, rather each CSC has only a single node or single terminal that is coupled to a common reference conductor. Multiple such CSCs are, however, disposed in integrated circuits. Each integrated circuit has an amount of logic (circuitry) that monitors the voltage on a single reference terminal. All the single nodes of the CSCs of the integrated circuit are coupled to this single reference terminal. If the logic detects that the common reference conductor is not being used by another integrated circuit of CSCs, then the logic causes the reference current from the conductor to flow into the integrated circuit through the single reference terminal, and causes the various CSCs of the integrated circuit to be calibrated. The CSCs in the integrated circuit are calibrated one at a time. During the time the CSCs within the integrated circuit are being calibrated, the logic causes the reference signal on the common reference conductor not to have the predetermined characteristic so that the logic circuits in the other integrated circuits of CSCs detect the common reference conductor as being used. When all the CSCs of the integrated circuit have been calibrated, then the logic circuit releases the common reference conductor. The logic circuits in other ones of the integrated circuits are then free to detect the common reference conductor as available, and to initiate self-calibration of the CSCs of another integrated circuit. The logic of each such integrated circuit includes an oscillator or timer that determines when the logic makes the decision as to whether the common reference conductor is available or not. The logic determines that the common reference conductor is available if the reference signal on the common reference conductor has the predetermined characteristic.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 11 is a diagram of another programmable CSC which includes a switching circuit and adjusts a current source so that the current it sinks equals a reference current.

FIG. 12 is a diagram of diode I/V curve for an N-channel field effect transistor (NFET) that is connected as a diode.

FIG. 13 is a diagram of the N-channel field effect transistor (NFET) of FIG. 12 when it is configured as a transistor.

FIG. 14 is a waveform diagram that illustrates two digital signals that control the switches of the switching circuit in FIG. 11.

DETAILED DESCRIPTION

Reference will now be made in detail to some embodiments of the invention, examples of which are illustrated in the accompanying drawings.

Figure 1:
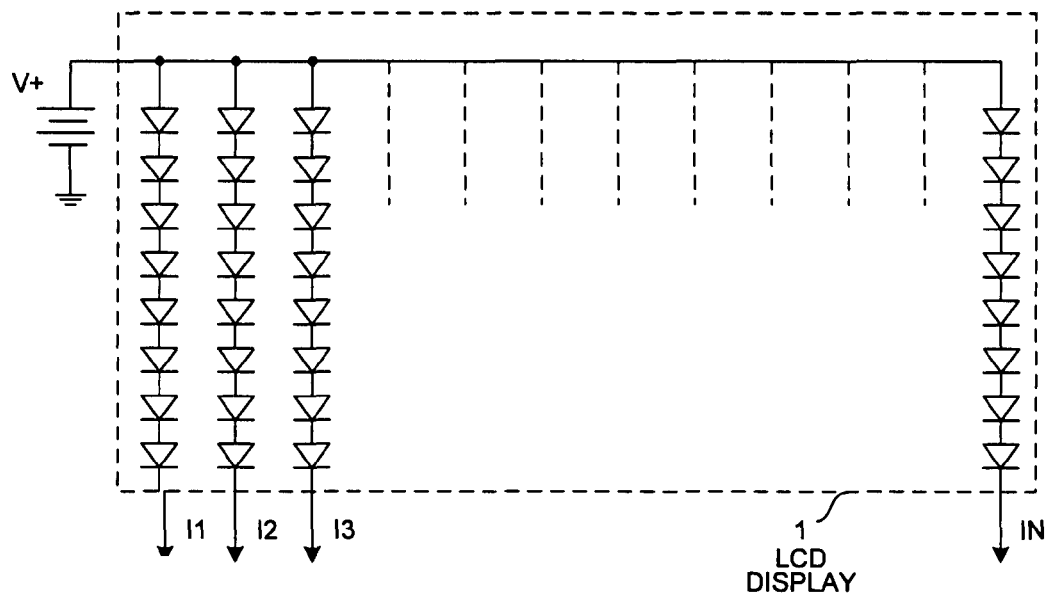
FIG. 1 (prior art) is a diagram of an LCD display that employs twelve strings of white light emitting diodes (WLEDs) for backlighting.
Figure 2:
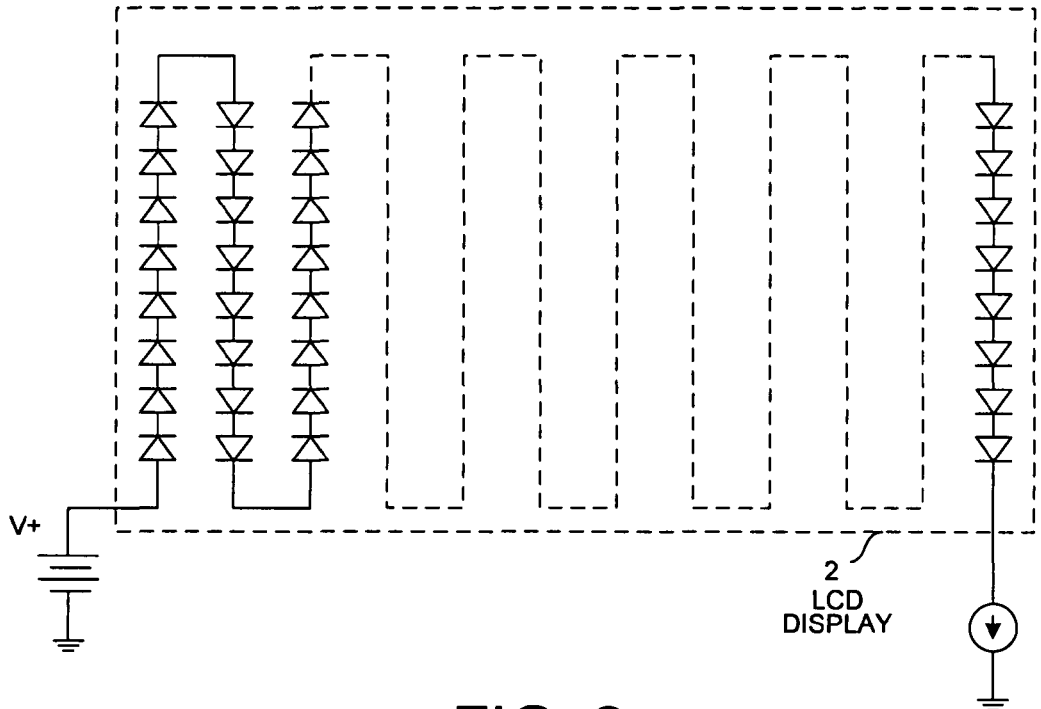
FIG. 2 (prior art) shows one way of providing current matching between multiple strings of WLEDs.
Figure 3:
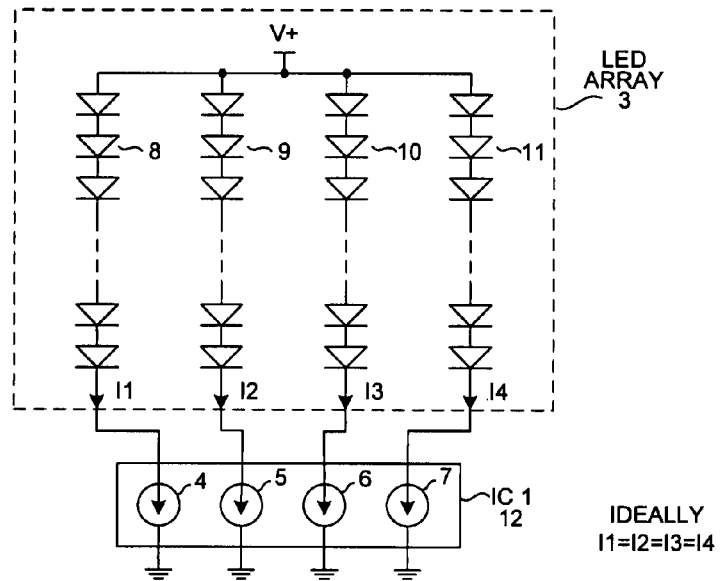
FIG. 3 (prior art) is a diagram that illustrates an array of four strings of WLEDs that are controlled by four corresponding current sources.
Figure 4:
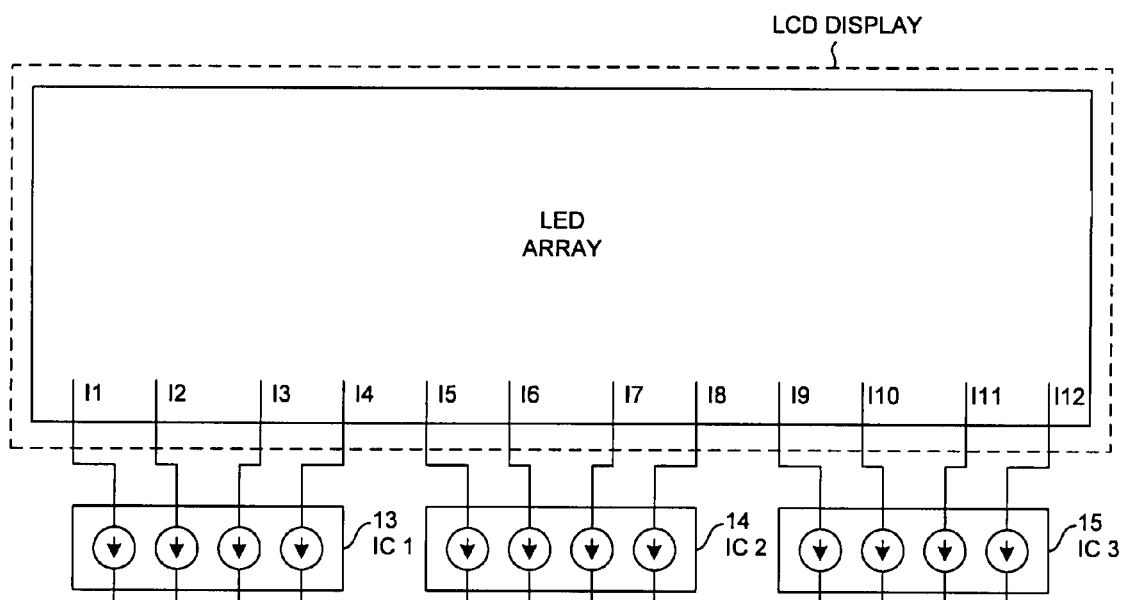
FIG. 4 (prior art) illustrates one problem with providing multiple integrated circuits to control a corresponding large number of WLED strings.
Figure 5:
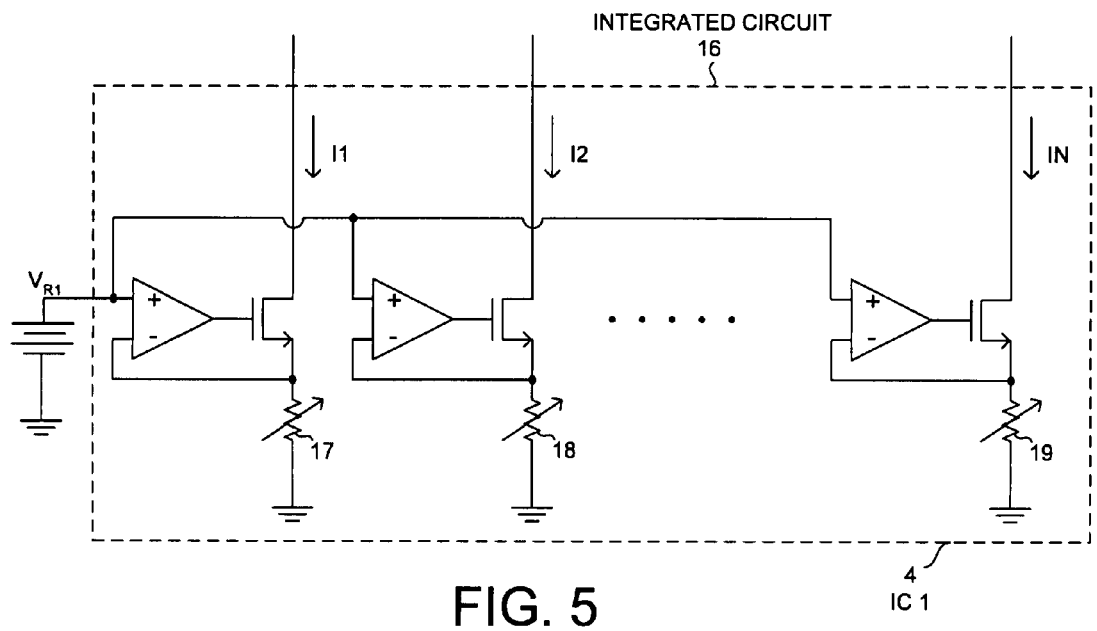
FIG. 5 (prior art) is a diagram that illustrates a technique employing resistor trimming to make on-chip current references more accurate.
Figure 6:
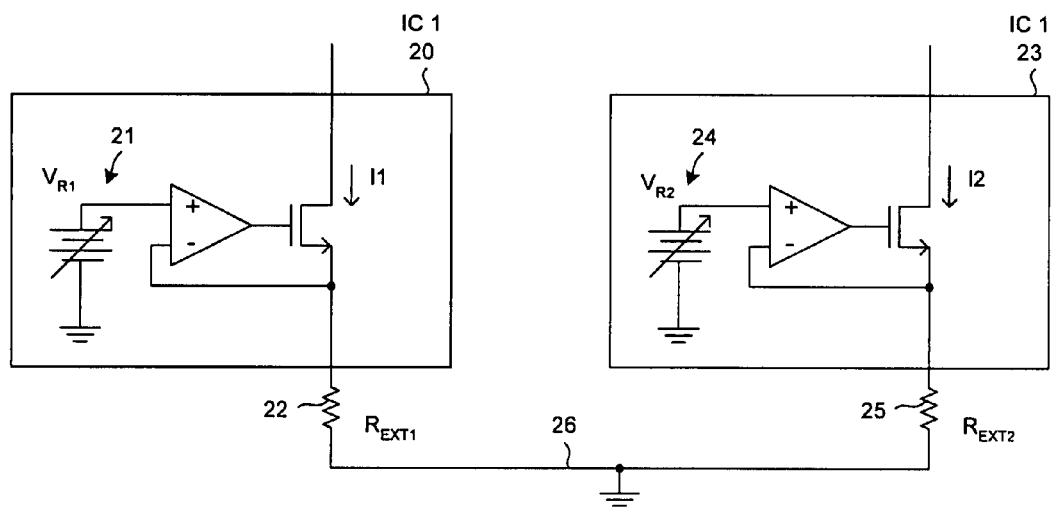
FIG. 6 (prior art) illustrates another technique for providing precisely controlled current sources between multiple integrated circuits.
Figure 7:
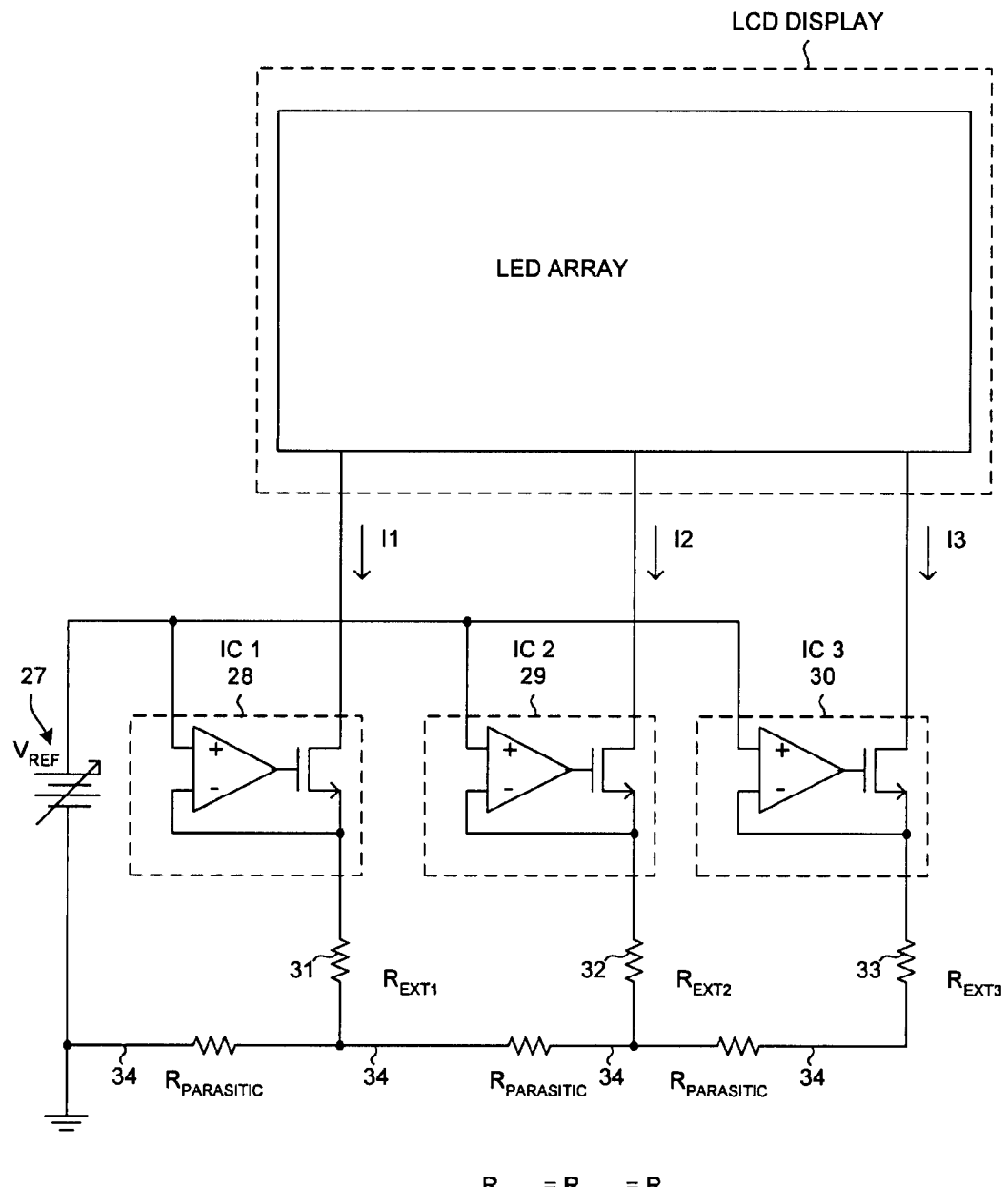
FIG. 7 (prior art) illustrates a further extrapolation of the potential solutions illustrated in FIG. 6.
Figure 8:
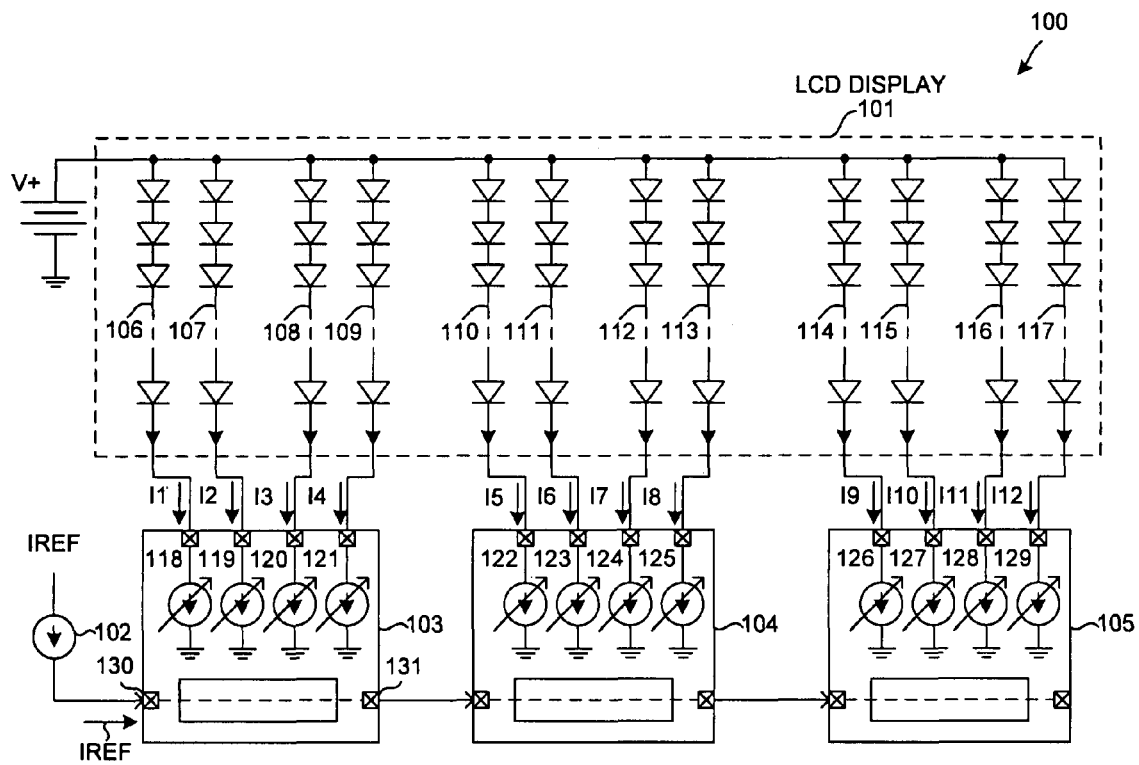
FIG. 8 is a simplified circuit diagram of a first aspect of the invention with an LCD display that includes an array of WLEDs, a current reference and a chain of integrated circuits.

FIG. 8 is a simplified circuit diagram of a system 100 in accordance with a first novel aspect. System 100 includes an LCD display 101 that includes an array of White Light Emitting Diodes (WLEDs), a current reference 102, and a chain of three integrated circuits 103-105. Each of the LED currents I1-I12 flows through a corresponding one of a plurality of strings 106-117 of WLEDs. The integrated circuits 103-105 include a plurality of programmable current source circuits (CSC) 118-129. The reference current IREF is bussed to each of the various different CSCs one at a time, so that the LED current controlled by the CSC is calibrated to match the reference current IREF. The reference current IREF goes into one terminal of an integrated circuit and out another terminal so that the reference current can be used in successive integrated circuits farther down the chain of integrated circuits. For example, the reference current IREF flows into integrated circuit 103 through terminal 130 and flows out of integrated circuit 103 through terminal 131.

Each integrated circuit in the chain determines for itself when the reference current is available for it to use to calibrate its internal CSCs by sensing the voltages at the reference current input terminal of the IC package and at the reference current output terminal of the IC package. If the integrated circuit could not determine that the reference current was available for calibration, then a situation might occur whereby calibration started when the reference current was not at its proper final value, or even worse, two separate integrated circuits might try to calibrate their CSCs at the same time resulting in the reference current being degraded. A degraded reference current would result in an improper calibration.

Figure 9:
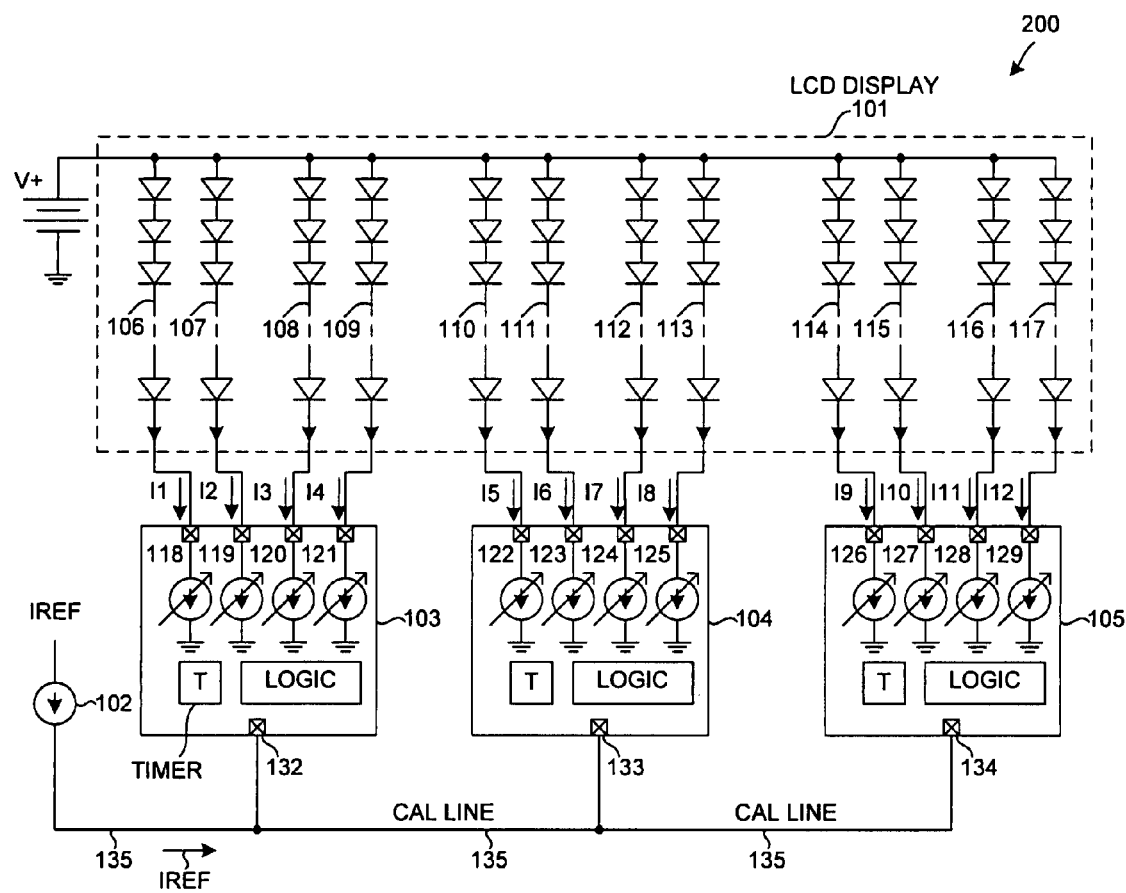
FIG. 9 is a simplified circuit diagram of a second aspect of the invention, which is similar to the first aspect in FIG. 8, except that the integrated circuits use only one terminal to receive a reference current.

FIG. 9 is a simplified circuit diagram of a system 200 in accordance with a second novel aspect. In system 200, LCD display 101 is identical to LCD display 101 of FIG. 8. As in the system of FIG. 8, each of the integrated circuits 103-105 includes a plurality of programmable current source circuits (CSCs). As in the system of FIG. 8, the CSCs of FIG. 9 are indicated with reference numerals 118-129. In the example of FIG. 9, however, each of the integrated circuits 103-105 uses only one terminal to receive the reference current IREF. For example, integrated circuit 103 receives the reference current IREF through terminal 132. The IREF terminals 132-134 of the three integrated circuits are coupled together and to the current source 102 by the same single conductor 135. Each integrated circuit monitors the voltage on its IREF terminal. If the voltage has a predetermined characteristic (is higher than a predetermined threshold for an adequate amount of time), then the integrated circuit determines that no other integrated circuit is pulling the voltage on IREF conductor 135 down and that the reference current IREF is available for calibration at this moment. The integrated circuit then pulls down on the reference current conductor 135 and uses the reference current IREF to calibrate itself. During the time that it has pulled the voltage of the reference current conductor 135 down, every other integrated circuit that is connected to the same conductor 135 determines that the signal on the current reference conductor 135 does not have the predetermined characteristic and that the current reference conductor 135 is in use by another integrated circuit. The other integrated circuits therefore have no choice but to wait until the reference current conductor 135 becomes available. An internal oscillator and/or timer within the integrated circuit times the intervals between calibration attempts of the integrated circuit. The oscillators of the integrated circuits 103-105 do not match each other's frequency and phase due to normal process variations so that attempts by the various integrated circuits to calibrate are not correlated in any periodic fashion. In this situation, the mismatch in period between calibration cycles keeps calibration attempt conflicts between two different integrated circuits to a minimum.

In order to adjust a CSC so that its LED current value matches (or is directly related to) a reference current, the CSC is adjusted and then the CSC maintains the adjusted value in a non-volatile way such that the programmed value of LED current does not change significantly until the CSC is recalibrated. There are several methods by which this can be accomplished.

Figure 10:
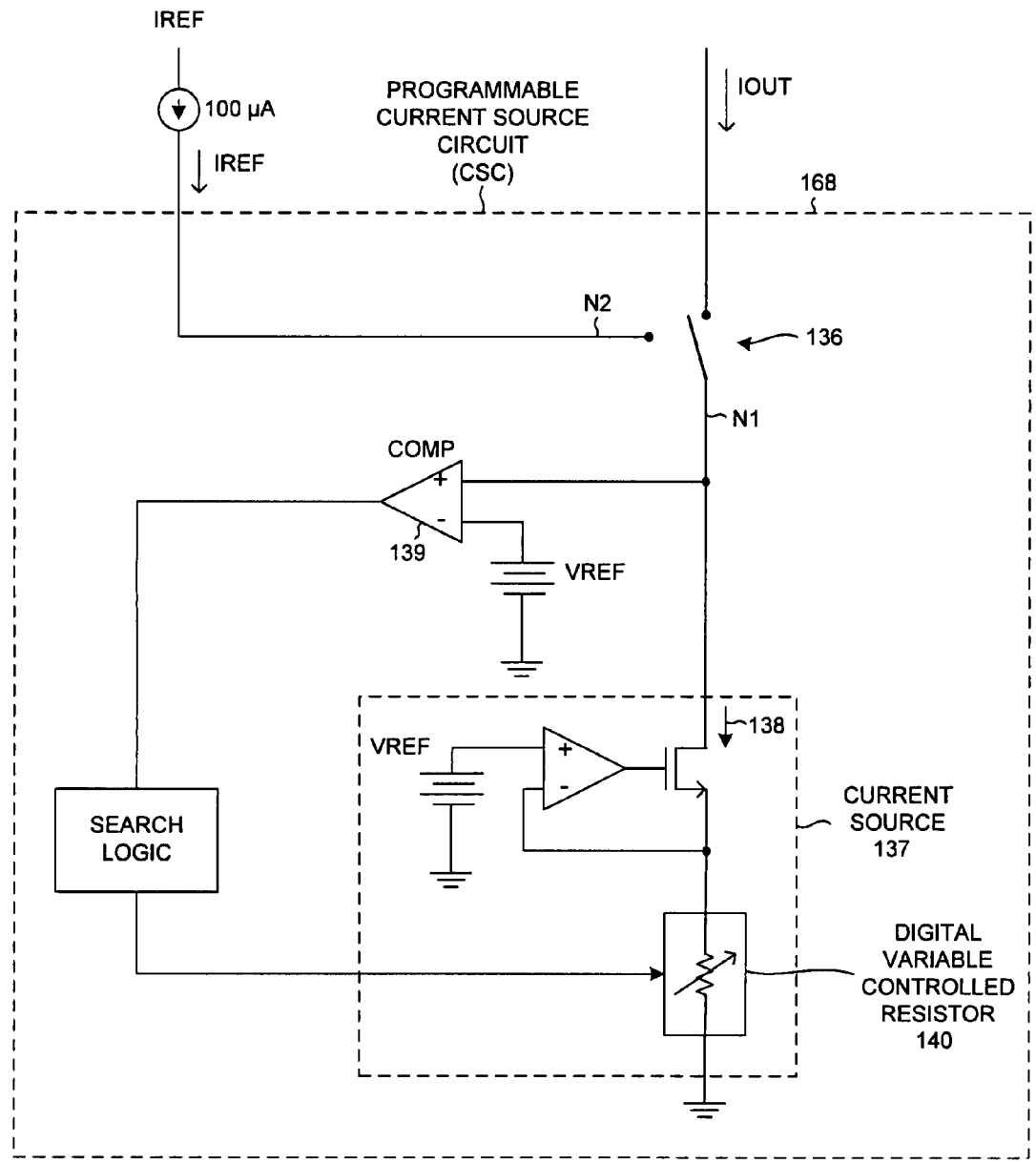
FIG. 10 is a diagram of a programmable current source circuit (CSC) involving a digital control loop that adjusts an LED current IOUT.

FIG. 10 is a diagram of a programmable CSC 168 involving a digital control loop. The digital control loop adjusts an LED current IOUT (indirectly by adjusting current 138) so that IOUT matches (or is directly related to) a reference current IREF. The control loop uses a binary search or other suitable algorithm to add (or subtract) the proper amount of extra current to match current 138 to the IREF. Assume first that switch 136 connects node N1 to node N2, and that current source 137 sinks a current 138. If current 138 is of a smaller magnitude than current IREF, then the voltage on node N1 will increase. If current 138 is of a larger magnitude than current IREF, then the voltage on node N1 will decrease. The initial voltage on node N1 is compared to a reference voltage VREF (for example, VDD/2) by a comparator 139. If the signal output by comparator 139 is a digital high, then current source 137 is adjusted to increase the current 138. This is done by controlling the variable resistor 140 to have a lower resistance value. If the signal output by comparator 139 is a digital low, then current source 137 is adjusted to decrease current 138. The circuit can search for the best resistor code in a linear fashion or by a binary weighted search. The determined best code is then stored in a digital register until the next time that a calibration is required. In an alternative control loop, the reference voltage on the non-inverting comparator input lead is a digitally controlled reference voltage and a fixed value resistor is used in place of resistor 140.

FIG. 11 is a diagram of another programmable CSC 169. Programmable CSC 169 adjusts a current source so that the current it sinks equals (or is directly related to) a reference current IREF. In this case, there are two programmable current sources 141 and 142 and a switching circuit 143. The first programmable current source 141 involves a first N-channel field effect transistor (NFET) 144 and the second programmable current source 142 involves a second NFET 145. During the programming of a programmable current source, the NFET of the programmable current source is put into a diode-connected configuration and the reference current IREF is forced through the NFET. The gate of the NFET will be driven to a voltage such that the NFET would sink that much current into its drain if the gate were forced externally to that same voltage value. At that point, the gate is disconnected from the drain and the gate capacitance holds the voltage at that value, causing the NFET to continue to sink the same current as the reference current.

FIG. 12 is a diagram of diode I/V curve for NFET 144 when it is connected as a diode. If the IOUT current of one hundred microamperes is forced through a diode having the curve of FIG. 12, then the voltage drop across the diode will be 1.5 volts.

FIG. 13 is a diagram of NFET 144 when it is configured as a transistor. If the voltage drop across the gate-to-source terminals is held at 1.5 volts by the gate capacitance, then the drain current will be held at one hundred microamperes when its drain voltage is at 1.5 volts.

In order to avoid interruption of the LED current being sunk into CSC 169 of FIG. 11 during programming, the dummy programmable current source 142 is used to sink the LED current IOUT while the main programmable current source 141 is being programmed. At the end of the cycle that programs the main programmable current source 141, the dummy programmable current source 142 is programmed so that its current value is the correct one to substitute for the current sunk into the main current source during the next programming cycle of the main current source.

FIG. 14 is a waveform diagram that illustrates two digital signals that control the switches of switching circuit 143. The high pulse of signal CAL_ACTUAL indicates a period during which programmable current source 141 is programmed, and the high pulse of signal CAL_DUMMY indicates a period during which programmable current source 142 is programmed. After the two programmable current sources of the CSC have been programmed, then the programmable current sources of the CSC remain in their programmed states for a period of time, thereby allowing the programmable current sources of other CSC to be programmed using the same reference current IREF.

Figure 15:
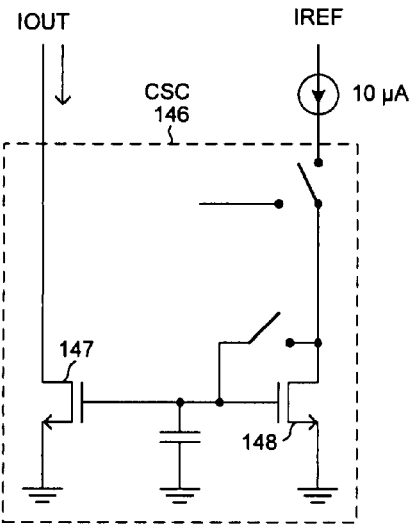
FIG. 15 is a circuit diagram of a programmable CSC that provides an LED current IOUT that is larger than a reference current IREF.

FIG. 15 is a circuit diagram of a programmable CSC 146 that provides an LED current IOUT that is larger than the reference current IREF. Programmable CSC 146 includes a current mirror in which the output NFET device 147 has a size that is a multiple of the size of the diode-connected NFET 148. The circuit of FIG. 15 has the disadvantage that a mismatch between the reference current IREF and output current IOUT may be introduced because of the normal process and geometrical mismatches inherent in any two adjacent NFET devices manufactured in a planar process.

Figure 16:
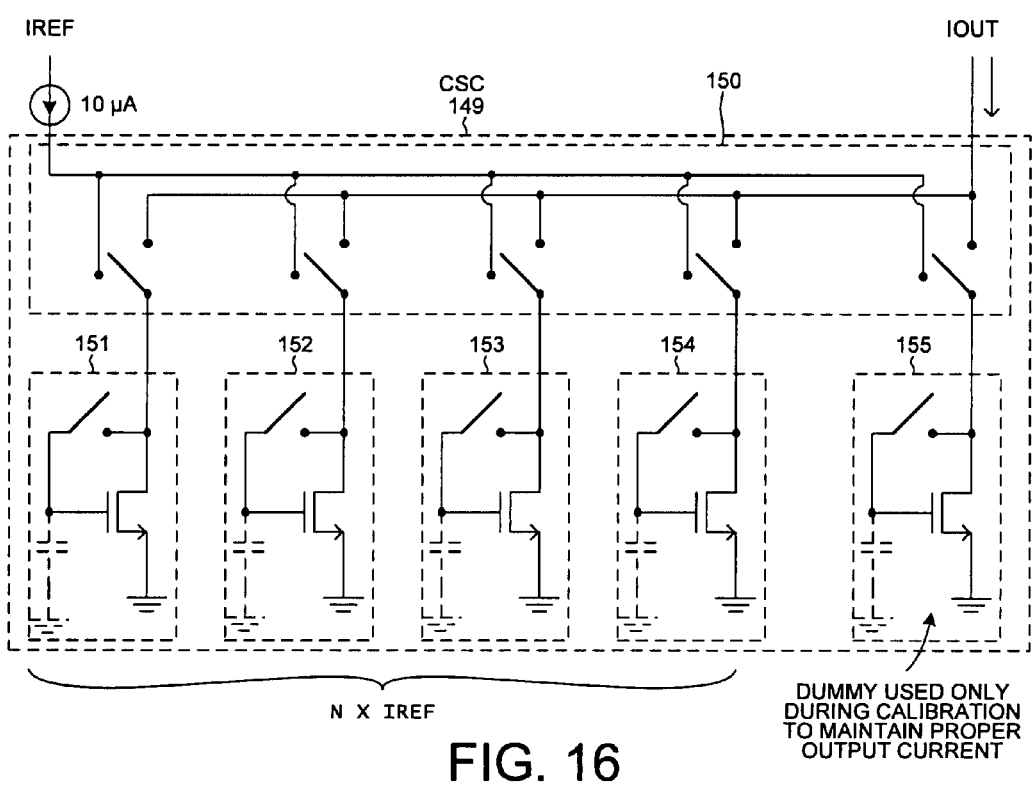
FIG. 16 is a diagram of another CSC and illustrates a method of providing an output current IOUT that has a greater magnitude than the reference current IREF.

FIG. 16 illustrates another CSC 149 and a method of providing an output current IOUT that has a greater magnitude than the reference current IREF. CSC 149 includes a switching circuit 150, multiple programmable current sources 151-154, and a dummy programmable current source 155. Each individual one of the programmable current sources 151-154 is calibrated so that the current the programmable current source sinks matches the reference current IREF. When one of the programmable current sources 151-154 is being calibrated and is using the reference current IREF, the dummy programmable current source 155 sinks the current that the current source that is being calibrated would otherwise be sinking were it not being calibrated. Accordingly, there are always four programmable current sources sinking current. There is no current mirror mismatch introduced such as in the circuit of FIG. 15.

Figure 17:
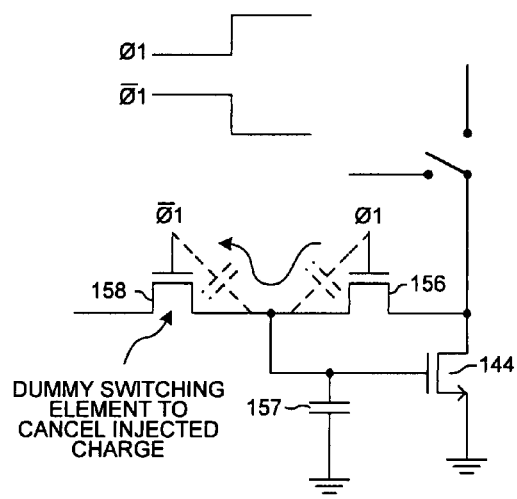
FIG. 17 is a diagram that illustrates an aspect of a real implementation of the circuit of FIG. 11.

FIG. 17 is a diagram that illustrates an aspect of a real implementation of the circuit of FIG. 11. The circuit of FIG. 11 might be subject to parasitic charge injection due to the gate capacitance of switch transistor 156 and due to leakage of actual NFET switches and as such a practical implementation might include another capacitor 157 to ground at the gate of NFET 144 and/or the use of a charge-canceling dummy switch 158.

Now that several ways of realizing a programmable CSC that can be calibrated by an externally supplied reference current have been described above, the programmable CSC functional block is used as a component in larger systems as described below. Two embodiments of using multiple CSC functional blocks are described, where the multiple CSC functional blocks are sequentially calibrated to a reference current IREF provided from a single reference current source.

FIRST EMBODIMENT

Figure 18:
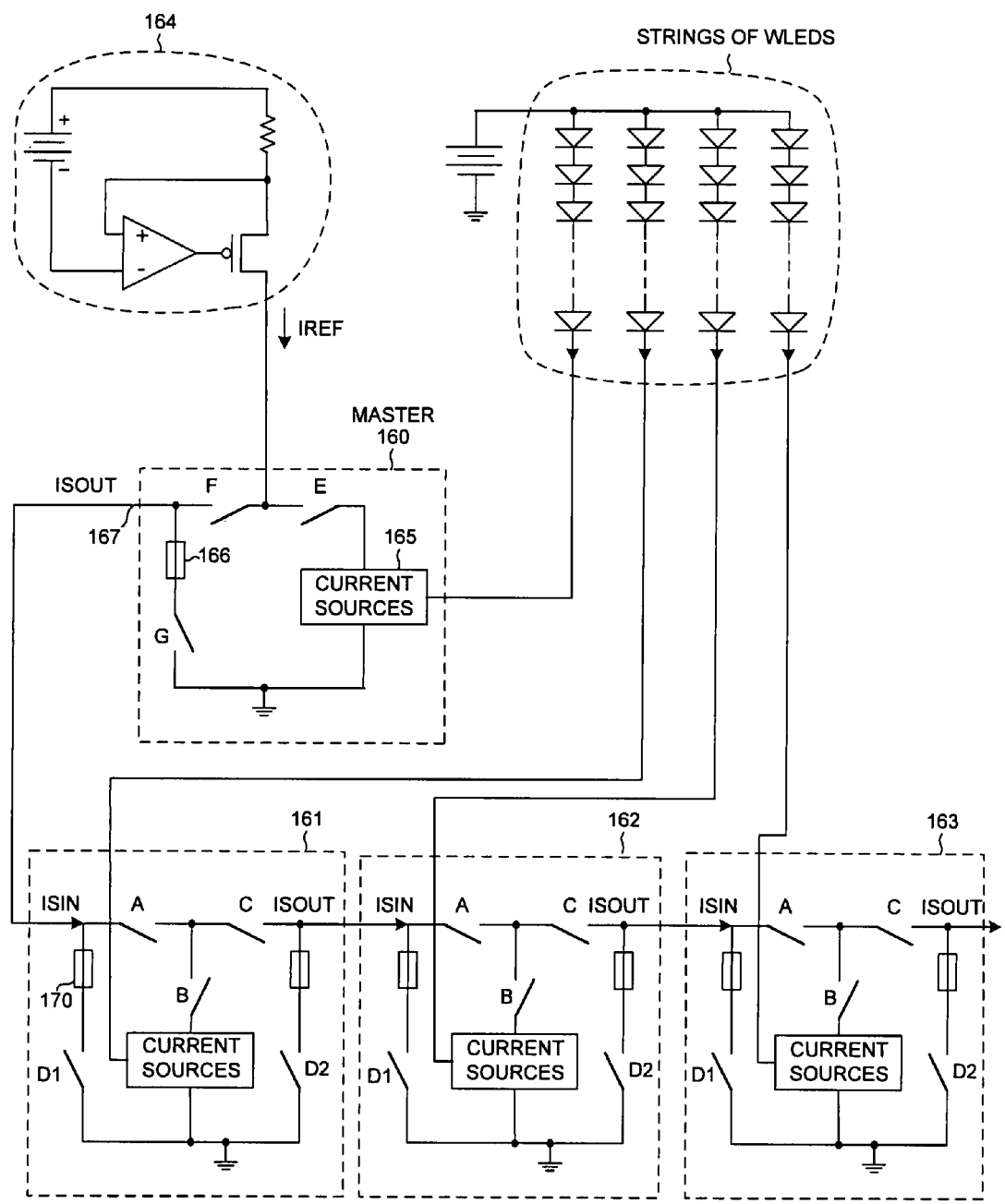
FIG. 18 is a diagram of an example of a first embodiment with four programmable CSCs.

FIG. 18 is a diagram that illustrates an example of the first embodiment. Four programmable CSCs 160-163 of a chain of CSCs are illustrated, but the concept applies equally well from two to a large number of programmable CSCs. The first programmable current source 160 is called the master CSC. A precisely controlled current source 164 (which may be included as part of the master CSC) outputs a reference current IREF. Inside the master CSC is a programmable current source 165 (or a block of programmable current sources), a small pull down current device (for example, 20 nA) 166, and three switches labeled "E", "F", and "G". The reference current IREF is supplied to the other CSCs of the chain through the ISOUT node 167 of the master CSC.

The other three programmable CSCs 161-163 of FIG. 18 are labeled "SLAVE". They consist of an identical (in this case identical but in general not identical) programmable current source block, two small pull down current devices, and switches A, B, C, D1, and D2. Switch A is optional. The slaves have no precisely controlled reference current generator but instead rely on reference current IREF from the master for calibration. The reference current IREF comes into each slave CSC at the ISIN node and exits (at the appropriate time) from the ISOUT node. Both the master CSC and slave CSCs have several comparators and logic and power and ground connections (not shown at this level of description).

At power on reset (POR), master CSC 160 uses IREF (which may be generated internal to master CSC but which is illustrated here as being generated externally by 164) to calibrate its current source 165 (or sources) while telling the slave CSCs that the reference current IREF is unavailable for their own calibration at the moment. The master CSC communicates to the other CSCs that the current reference is unavailable for slave calibration by pulling the voltage on its ISOUT node down. When the voltage is pulled down in this way, the ISIN of the next slave CSC in the chain does not have a signal with the predetermined characteristic. A comparator (not shown) in the slave CSC senses that the voltage on the slave's ISIN node is low, and in response does not start a calibration cycle but rather passes on the information that the reference current is not available for calibration by pulling the voltage down on its ISOUT node, which in turn signals the next slave CSC in the chain. That next slave CSC in turn passes on the information and so on and so on until all the slave CSCs have been informed.

After master CSC 160 has calibrated its own internal programmable current source(s) 165, it switches the IREF current onto its ISOUT node 167. The reference current (which is significantly larger than the twenty nanoampere small pull down current pulled by device 170 through switch D1 of CSC 161) raises the voltage at the master CSC ISOUT node 167 which also raises the voltage of the ISIN node of the slave CSC 161. The signal on the ISIN node of slave CSC 161 now has the predetermined characteristic. A comparator inside slave CSC 161 detects the predetermined characteristic (a voltage rise on the ISIN node) and control circuitry in slave CSC 161 switches the reference current from the master into the programmable current source of the first slave in order that the programmable current source might be calibrated to the reference current from the master. Switch D1 is open, and switches A and B are closed, and switch C is open. Switch D2 is closed.

Once the programmable current source of slave CSC 161 has finished its calibration cycle, the control circuitry of slave CSC 161 passes the reference current from master CSC 160 straight from the slave ISIN node of CSC 161 to the ISOUT node of CSC 161. Switches A and C are closed, and switches B, D1 and D2 are open. The reference current is therefore supplied through the first slave CSC 161 to the next slave CSC in the chain. That, in turn, causes signal on the ISIN node of the next slave CSC 162 to have the predetermined characteristic (a voltage rise on the ISIN node of the next slave CSC 162). The next slave CSC 162 determines that it should use the reference current to calibrate its own internal programmable current sources. Slave CSC 162 calibrates its internal current sources then passes the reference current onto the next slave unit 163, and so on and so on until the end of the chain of slave CSCs has been reached.

When the last slave CSC in the chain has finished its calibration, it tries to pass on the reference current on to the next slave CSC but there is no such next CSC. The voltage on the ISOUT node of the last slave CSC 163 rises until it hits the supply voltage VDD of the slave or the circuitry of the reference current in the master limits its positive travel.

The high voltage at the ISOUT node of the last slave CSC 163 indicates that the chain of CSCs has been completely calibrated. Because the reference current IREF is now passing through all of the slave CSCs (in order to reach the last slave CSC), the voltage of every ISOUT and ISIN node of every slave CSC and the ISOUT node of the master CSC all reach this higher voltage at substantially the same time. Master CSC 160 detects this higher voltage at its ISOUT node 167 for longer than a period of time TIME1 and determines that the whole chain has been calibrated. Master CSC 160 then again uses the reference current IREF to calibrate its own internal programmable current sources which in turn pulls the voltage at ISOUT node 167 down and starts the whole cycle again. If it is not desired that a calibration cycle start immediately at the end of a previously finished calibration cycle, then master CSC 160 may be made to wait for an externally supplied signal to start the next calibration cycle. Alternatively, master CSC 160 has an internal oscillator and/or timer that generates a signal that initiates the next calibration cycle. By simply coupling a capacitor onto the ISOUT node of last slave CSC 163, the next calibration cycle is delayed by the time it takes the reference current IREF to charge up the capacitor to the higher voltage threshold required by the master CSC to determine that the last slave CSC has been calibrated.

In one example, there are four programmable CSCs in each of a plurality of integrated circuit devices, where the chain of programmable CSCs extends serially through each of the integrated circuits. The four programmable CSCs 160-163 of FIG. 18 are all part of a single first integrated circuit that is the first integrated circuit in chain of integrated circuits. After the last slave CSC 163 has been calibrated, a delay of approximately five hundred microseconds occurs before a new calibration cycle is initiated.

In another example, blocks 160-163 represent different integrated circuits. Each integrated circuit includes one set of switches, but multiple programmable current sources. Once the switches of an integrated circuit are switched so that the reference current is used on the integrated circuit for calibration purposes, the programmable current sources of that integrated circuit use the reference current one by one until they are all calibrated. After all of the programmable current sources are calibrated, the switches of the integrated circuit are switched to forward the reference current on to the next integrated circuit in the chain.

Figure 19:
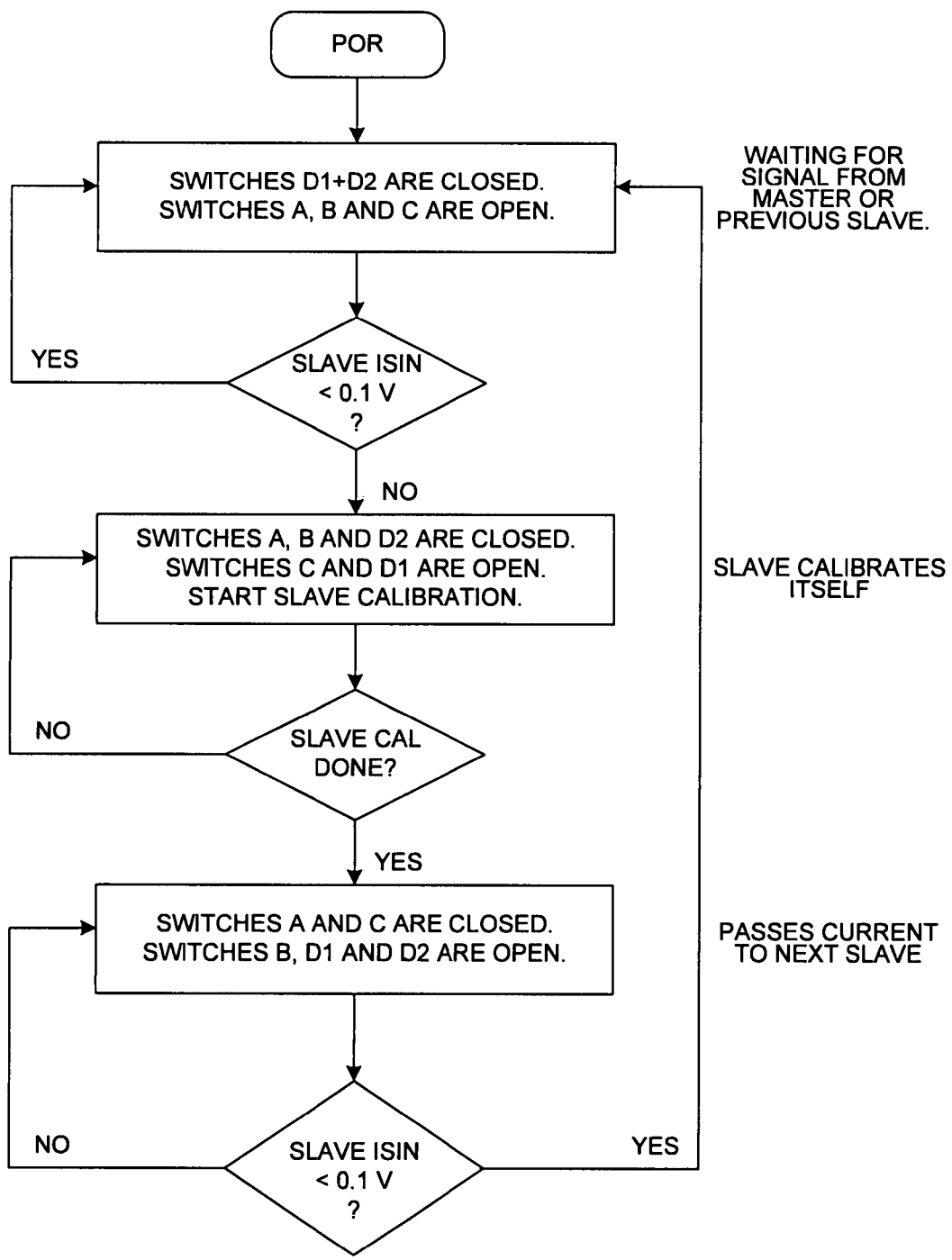
FIG. 19 is a flowchart that illustrates the operation of a slave CSC in the embodiment of FIG. 18.
Figure 20:
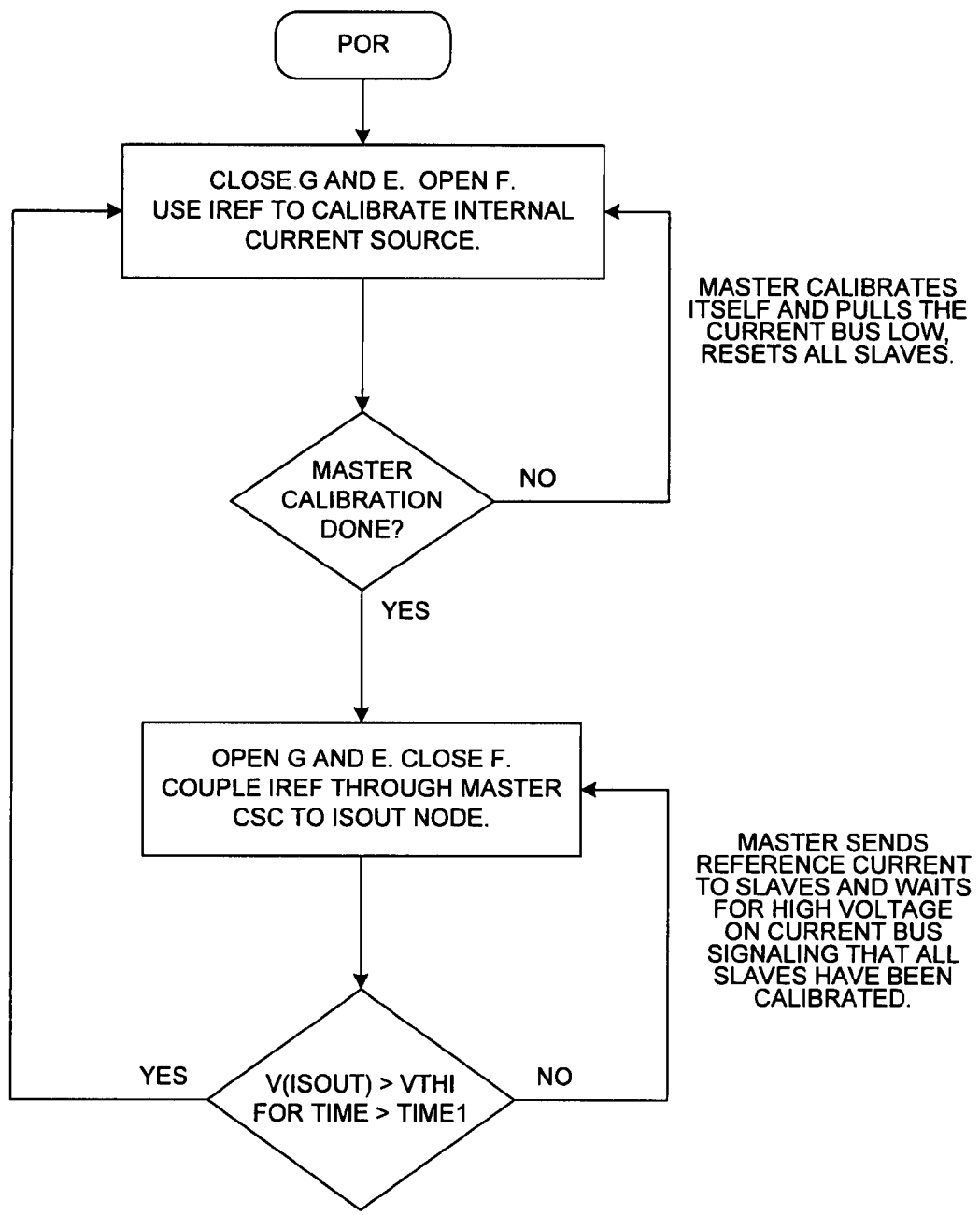
FIG. 20 is a flowchart that illustrates the operation of a master CSC in the system of FIG. 18.

FIG. 19 is a flowchart that illustrates an operation of a slave CSC in the system of FIG. 18. FIG. 20 is a flowchart that illustrates an operation of the master CSC in the system of FIG. 18. The small pulldown current devices of a CSC are turned off after the slave CSC has been calibrated. If this were not the case, then the reference current would be diminished by the value of the pulldown current devices each time a subsequent slave CSC was calibrated. By the time the last slave CSC was calibrated, the reference current would have been diminished by two times the number of slave CSC units times the value of the pulldown current device. That would introduce a large error if the number of slave CSCs in the chain were large.

Figure 21:
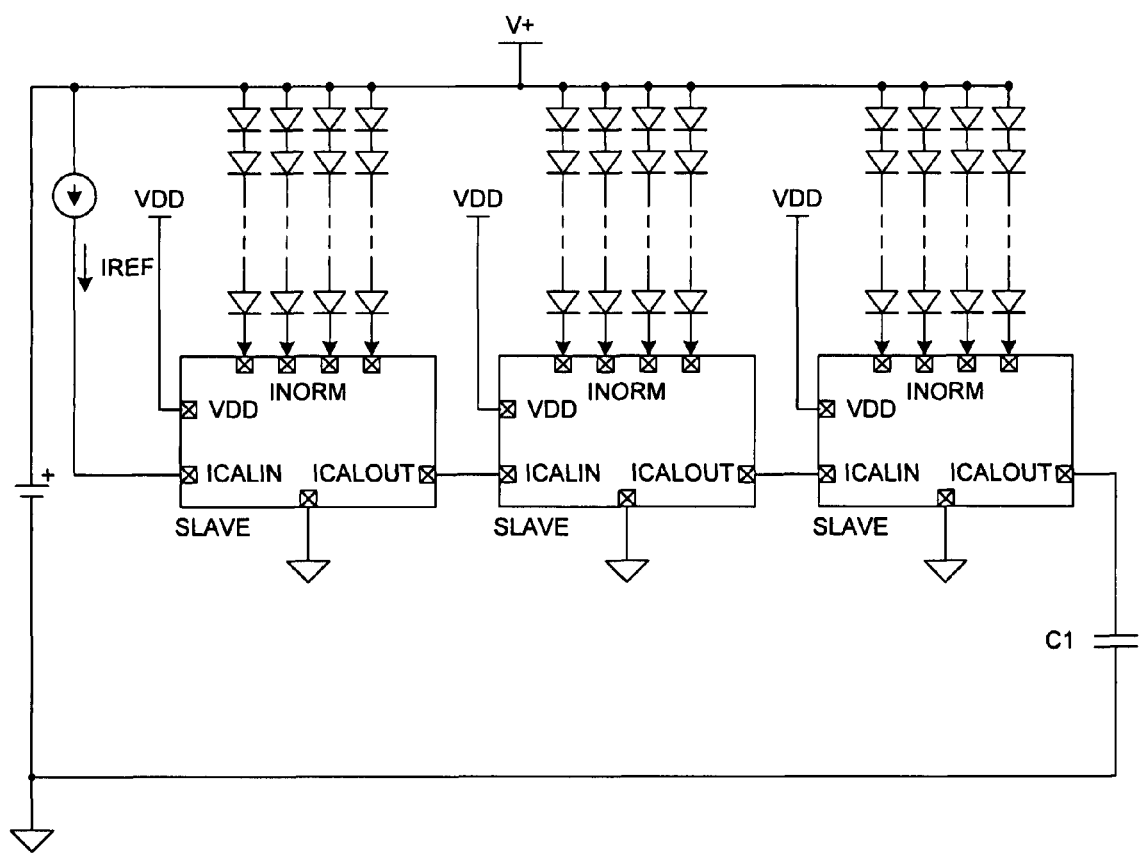
FIG. 21 is a schematic diagram of a top level test circuit wherein the function of the master CSC is replaced by a current source.

FIG. 21 is a schematic of a top level test circuit that was simulated. For purposes of simplification, the master CSC 160 of FIG. 19 is not provided in the test circuit simulation, but rather the function of the master CSC is replaced by a current source.

Figure 22:
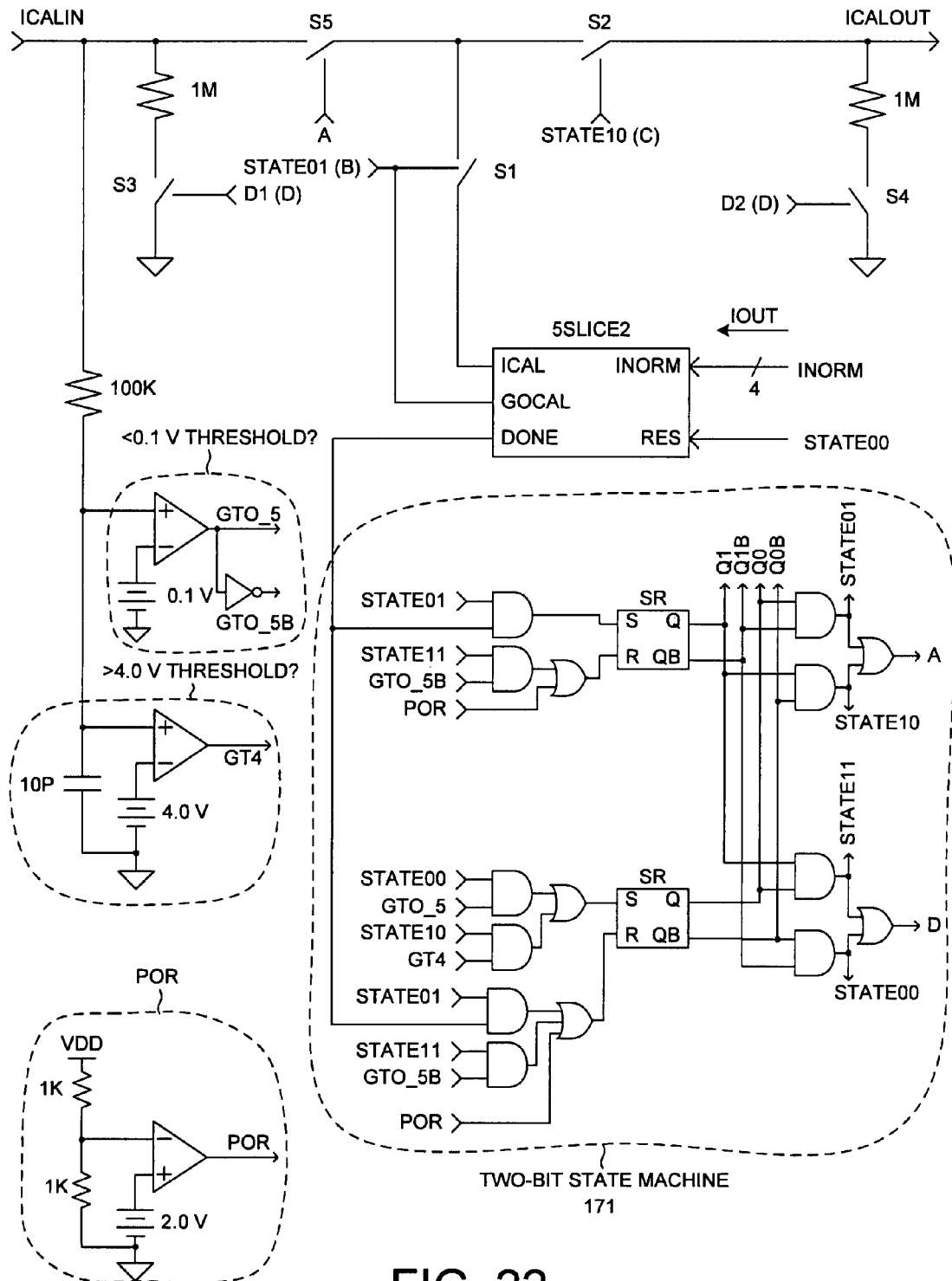
FIG. 22 is a more detailed schematic diagram of the circuitry within each of three slave CSCs of FIG. 21.

FIG. 22 is a more detailed schematic of the circuitry within each of the three slave CSCs in FIG. 21. In the center of the schematic is the programmable current source block labeled 5SLICE2. Surrounding block 5SLICE2 are switches S1 through S5 that correspond to the switches B, C, D1, D2 and A in the slave CSCs of FIG. 18. The circuit of FIG. 22 also includes a two-bit state machine 171 that controls the calibrating sequence.

Figure 23:
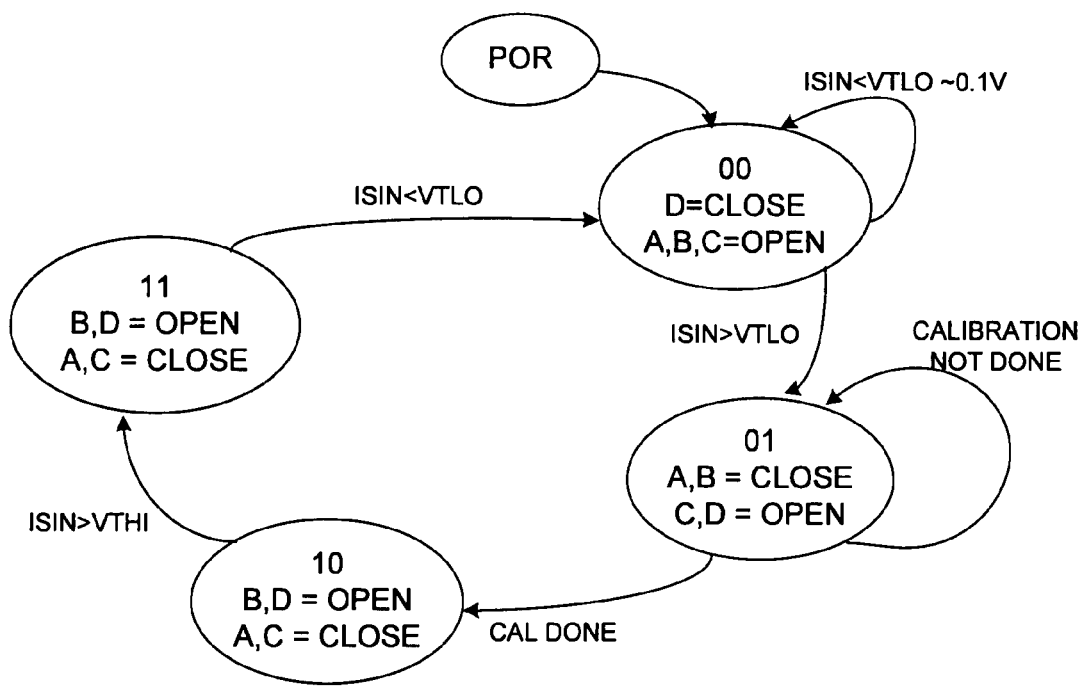
FIG. 23 is a state diagram that illustrates an operation of a two-bit state machine of FIG. 22.
Figure 24:
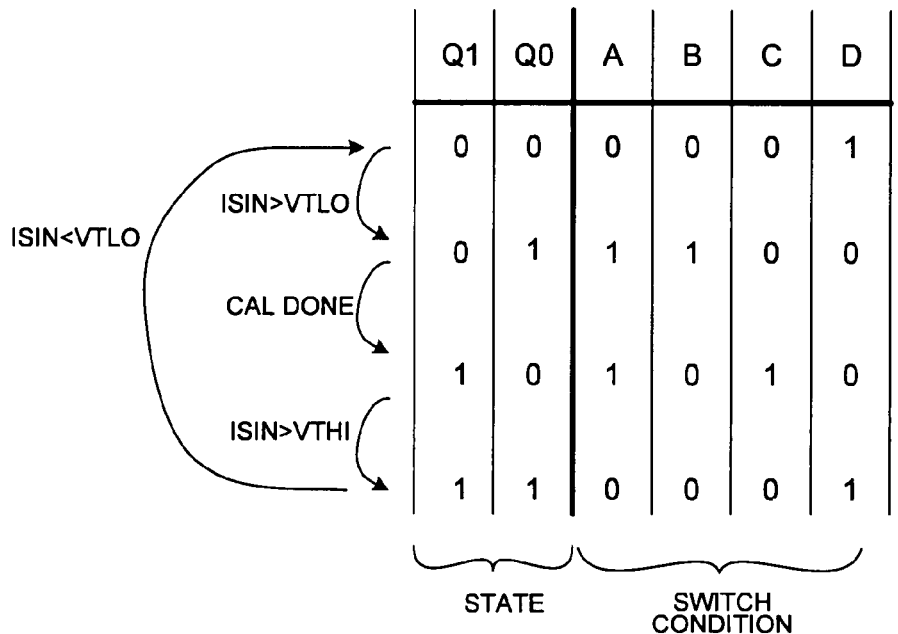
FIG. 24 is a logic table that sets forth the operation of the two-bit state machine of FIG. 22.

FIGS. 23 and 24 are a state diagram and a logic table that set forth operation of the two-bit state machine 171 of FIG. 22. As illustrated in FIG. 22, there are also three comparator circuits in each slave CSC. The first comparator is used to generate a power-on-reset signal POR signal when the supply voltage VDD level is below a predetermined threshold. The second comparator determines when the slave CSC's ICALIN node (ICALIN is referred to as ISIN in the earlier Figures) is above a threshold voltage VTLO (for example, 0.1 volts) that is lower than the voltage on ICALIN when the programmable current sources are being calibrated. When the voltage on the ICALIN node rises above this threshold VTLO, the slave CSC determines that the reference current is now available for it (the slave CSC) to use for the slave's calibration. The third comparator senses when voltage on the ICALIN node is above a threshold voltage VTHI (for example, 4.0 volts). VTHI is significantly higher than the voltage on the ICALIN node when the programmable current sources are being calibrated. When the voltage on the ICALIN node rises above this higher threshold voltage VTHI for a period of time longer than TIME1, it is determined (for example, by the master CSC) that all the slaves of the entire string of slave CSCs have been calibrated.

Figure 25:
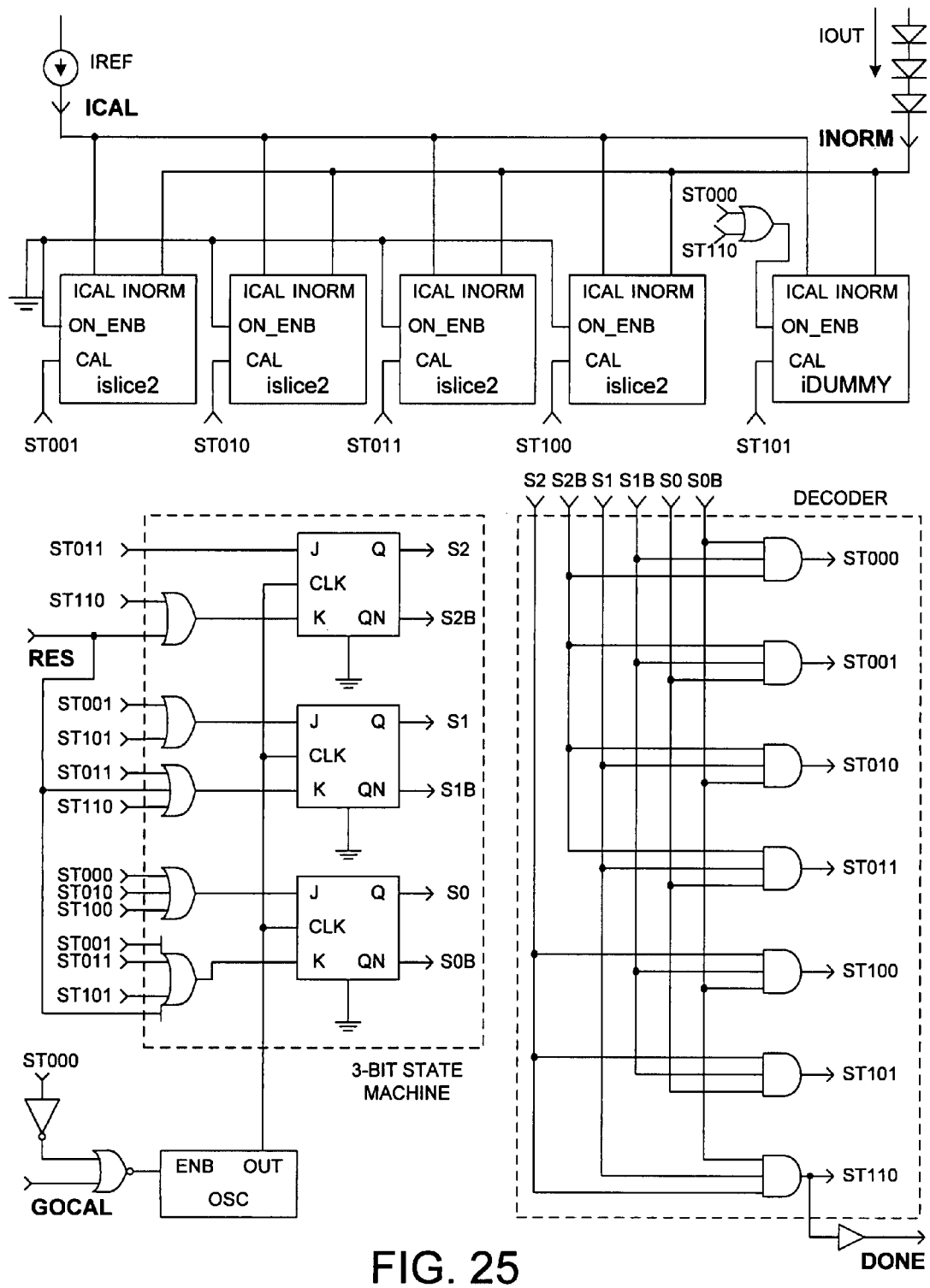
FIG. 25 is a circuit diagram of block 5SLICE2 of FIG. 22.

FIG. 25 is a circuit diagram of block 5SLICE2 of FIG. 22. FIG. 25 shows one IOUT, although four IOUTs are shown in FIG. 22. Each IOUT shown in FIG. 22 requires four islice2 circuits and one iDUMMY. Block 5SLICE2 includes blocks called islice2 that are similar to the block of FIG. 16 except that islice2 uses ideal circuit components rather than real NFETs.

Figure 26:
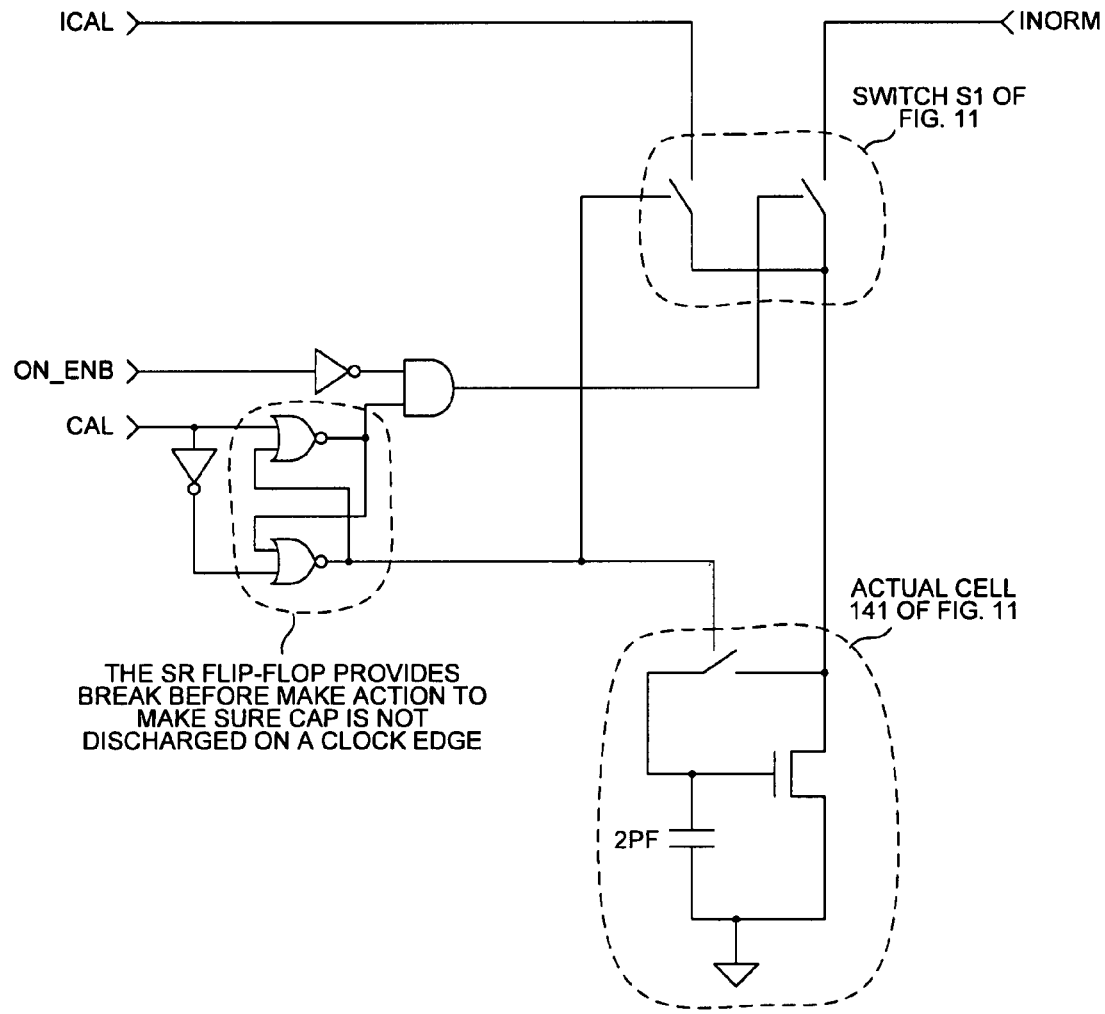
FIG. 26 is a circuit diagram of block islice2 of FIG. 25.

FIG. 26 is a circuit diagram of block islice2 of FIG. 25.

SECOND EMBODIMENT

Figure 27:
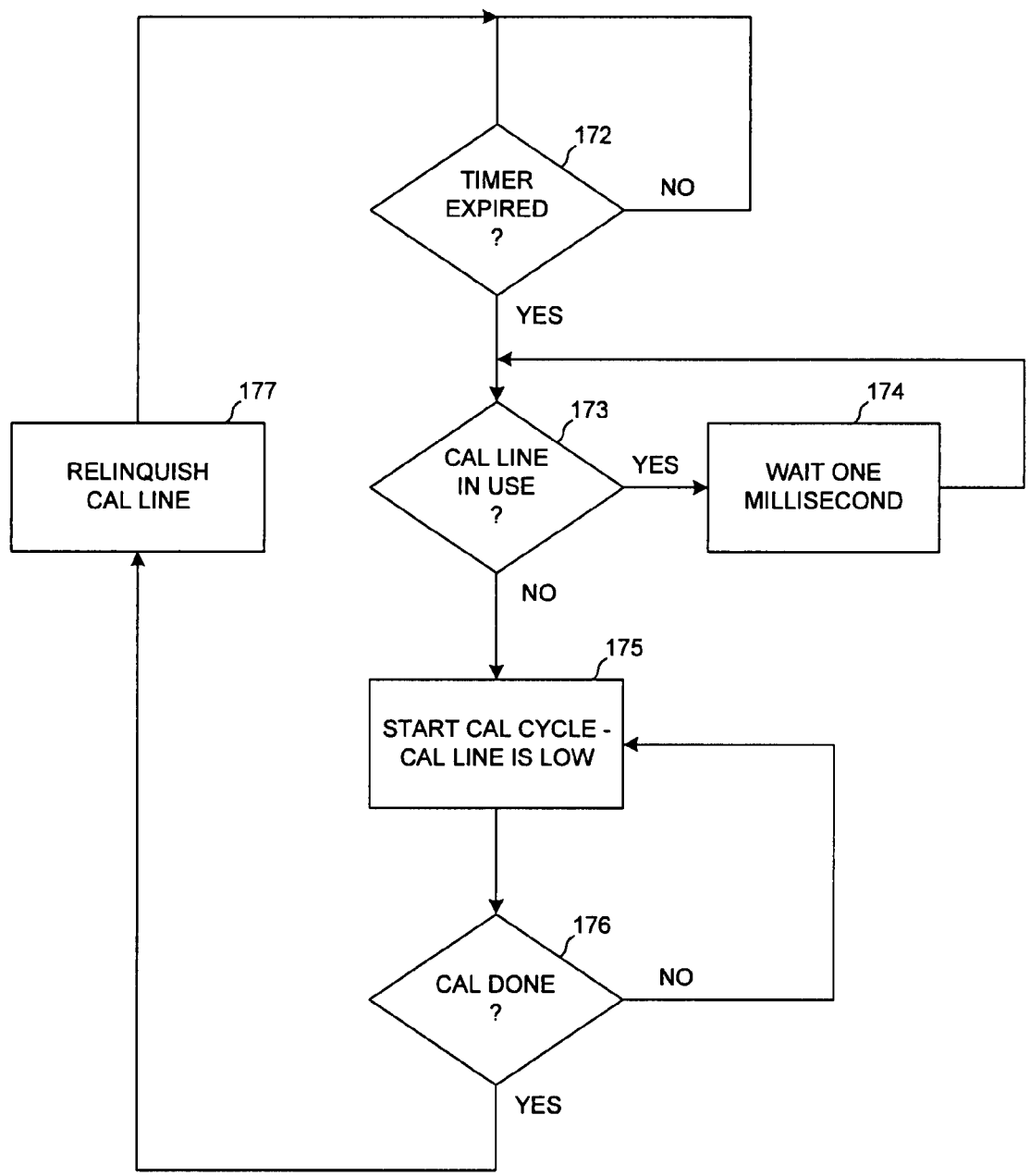
FIG. 27 is a flowchart illustrating the operation of the second embodiment of FIGS. 9 and 29 in which a timer and logic internal to every integrated circuit of current sources initiates calibration of the CSCs of the integrated circuit.

FIG. 27 is a diagram that illustrates an operation of the second embodiment. The second embodiment employs the technique set forth in connection with FIG. 9. As in the example of the first embodiment described above, the system includes a number of programmable CSCs grouped into a certain number of integrated circuits. In the case of FIG. 9, there are three different integrated circuits 103-105 and each integrated circuit includes four programmable CSCs. This is but an example. There are no constraints on the number of CSCs and integrated circuits.

The system illustrated in FIG. 9 utilizes a single reference current conductor 135 (sometimes called a "bus") that is connected to one and only one terminal of every integrated circuit. The reference current IREF is available for calibration when the voltage on the reference current bus 135 is above a predetermined threshold for a predetermined amount of time. When a particular integrated circuit wants to calibrate its programmable CSCs, the integrated circuit first checks the voltage of the reference current conductor 135 to see if conductor 135 is available. Conductor 135 is at a high voltage if it is available. If current reference conductor 135 is available, then the integrated circuit pulls the voltage on conductor 135 down so that other ones of the integrated circuits will not try and use the reference current conductor 135 for calibration at the same time. In one example, each programmable CSC operates independently of the others such that the programmable CSCs of the same integrated circuit determine whether to calibrate themselves. Alternatively, each integrated circuit may include circuit for determining that all the programmable CSCs on the integrated circuit are to be calibrated (even though the programmable CSC may then be calibrated one at a time).

Figure 29:
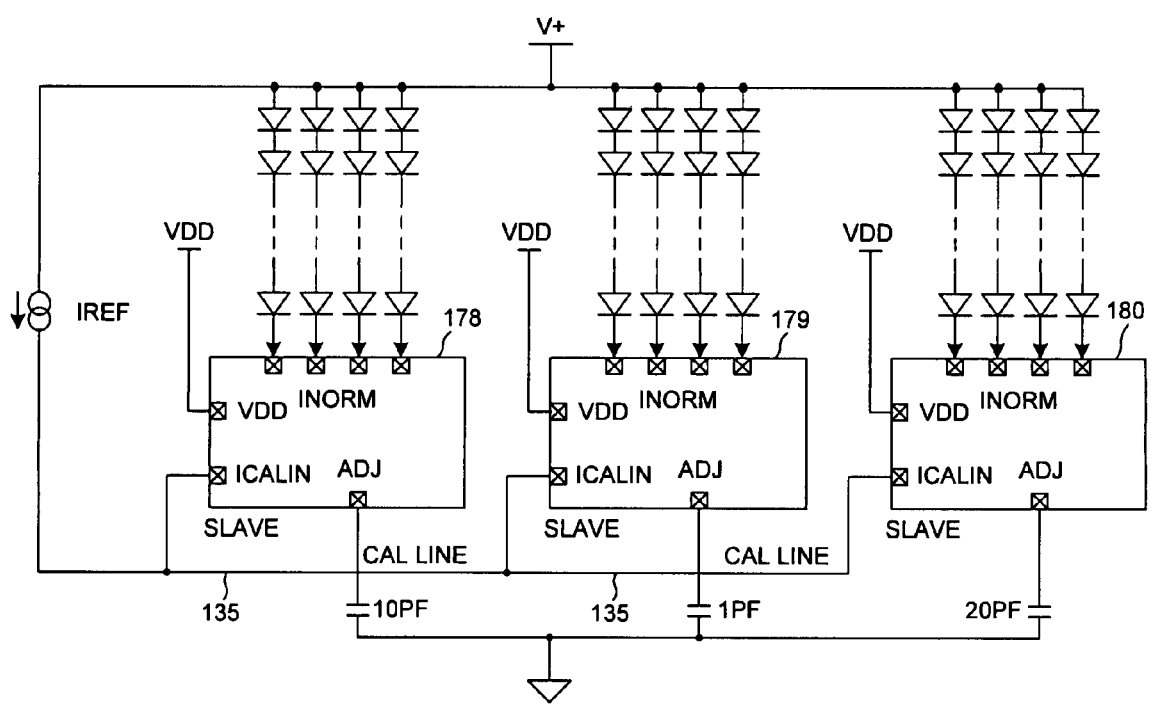
FIG. 29 is a diagram of a test circuit of the second embodiment that is fashioned from ideal circuit elements.

FIG. 27 is a flowchart of an operation of the embodiment of FIGS. 29 and 9. In the example of FIG. 9 and FIG. 27, a timer and logic internal to every integrated circuit of current sources initiates calibration of the CSCs of the integrated circuit. If the timer of the integrated circuit expires (step 172), then the integrated circuit checks (step 173) to determine whether the current reference conductor 135 (also referred to as the "CAL LINE") is available. If the voltage on conductor 135 is below the predetermined threshold voltage, then the integrated circuit determines that conductor 135 is not available and the timer is set again so that the integrated circuit will wait again (step 174) until it tries to calibrate again. If, on the other hand, conductor 135 is determined to be available as indicated by the voltage on conductor 135 being above the predetermined threshold for more than a particular amount of time, then the integrated circuit starts its calibration cycle and pulls the voltage on conductor 135 below the predetermined threshold voltage (step 175). The integrated circuit then uses the reference current from conductor 135 to calibrate each of the CSCs on the integrated circuit one by one (step 176), all the while holding conductor 135 in the unavailable state so that other integrated circuits will not try to initiate calibration cycles. When the calibration of all the CSCs of the integrated circuit is completed, then the integrated circuit relinquishes conductor 135 (step 177). The integrated circuit relinquishes conductor 135 by no longer pulling the voltage on conductor 135 below the predetermined threshold voltage).

Figure 28:
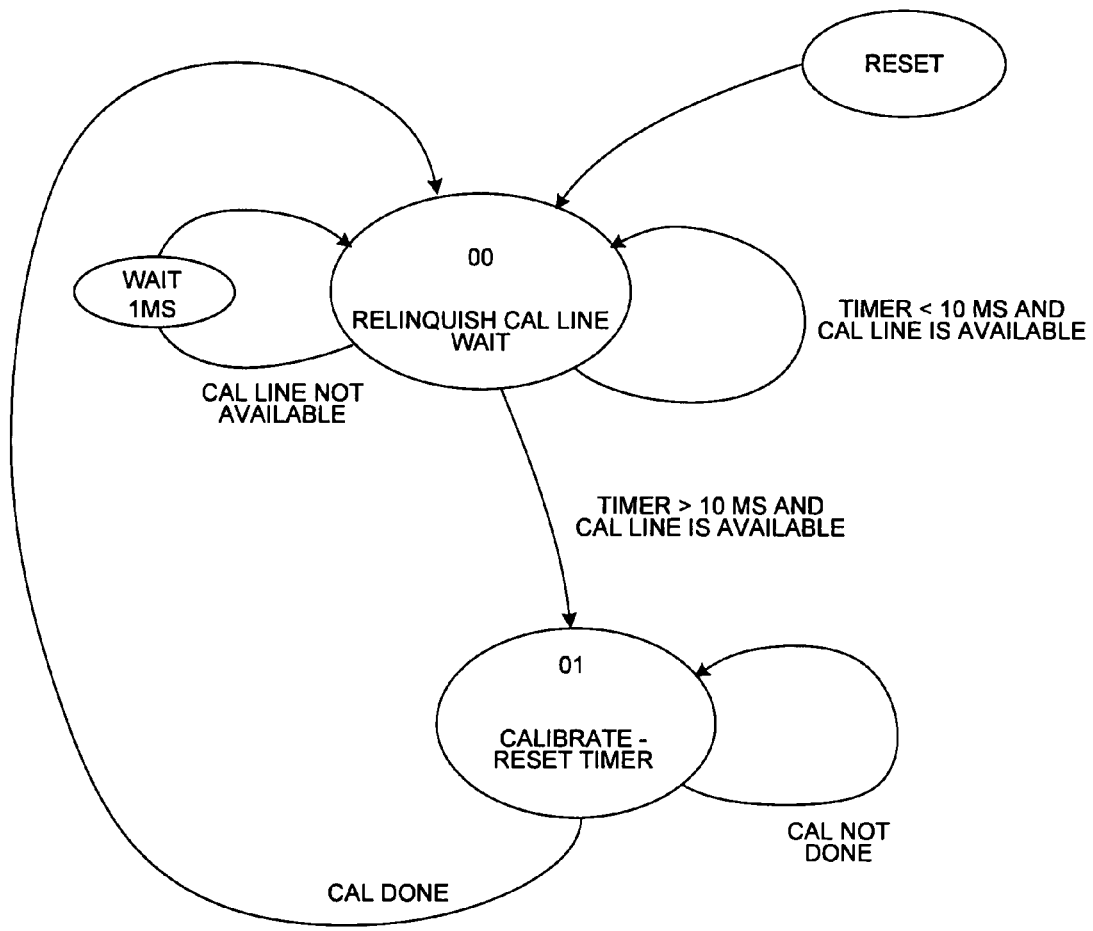
FIG. 28 is a state diagram of the calibration method of FIG. 27.

FIG. 28 is a state diagram of the calibration method of FIG. 27. The time between subsequent calibration cycles of a particular integrated circuit depends on the implementation details of the programmable CSCs. If their retention is short then they will have to be calibrated more often, whereas if their retention is long then they can be calibrated at longer intervals.

FIG. 29 is a diagram of a test circuit of the second embodiment, fashioned from ideal circuit elements. In FIG. 29, there are three integrated circuits 178-180. Each integrated circuit has its own internal oscillator and timer that indicate when the integrated circuit should attempt to calibrate its programmable CSCs. Due to the ideal nature of the devices that are used in the test circuit of FIG. 30, an offset must be introduced into the oscillators otherwise they would continually try to calibrate themselves at the same time. To that end, a small capacitor, each of a different value, is added to each integrated circuit to ensure that that periods between calibration cycles are not correlated between all the different integrated circuits. In a real integrated circuit, these external capacitors are not necessary.

Figure 30:
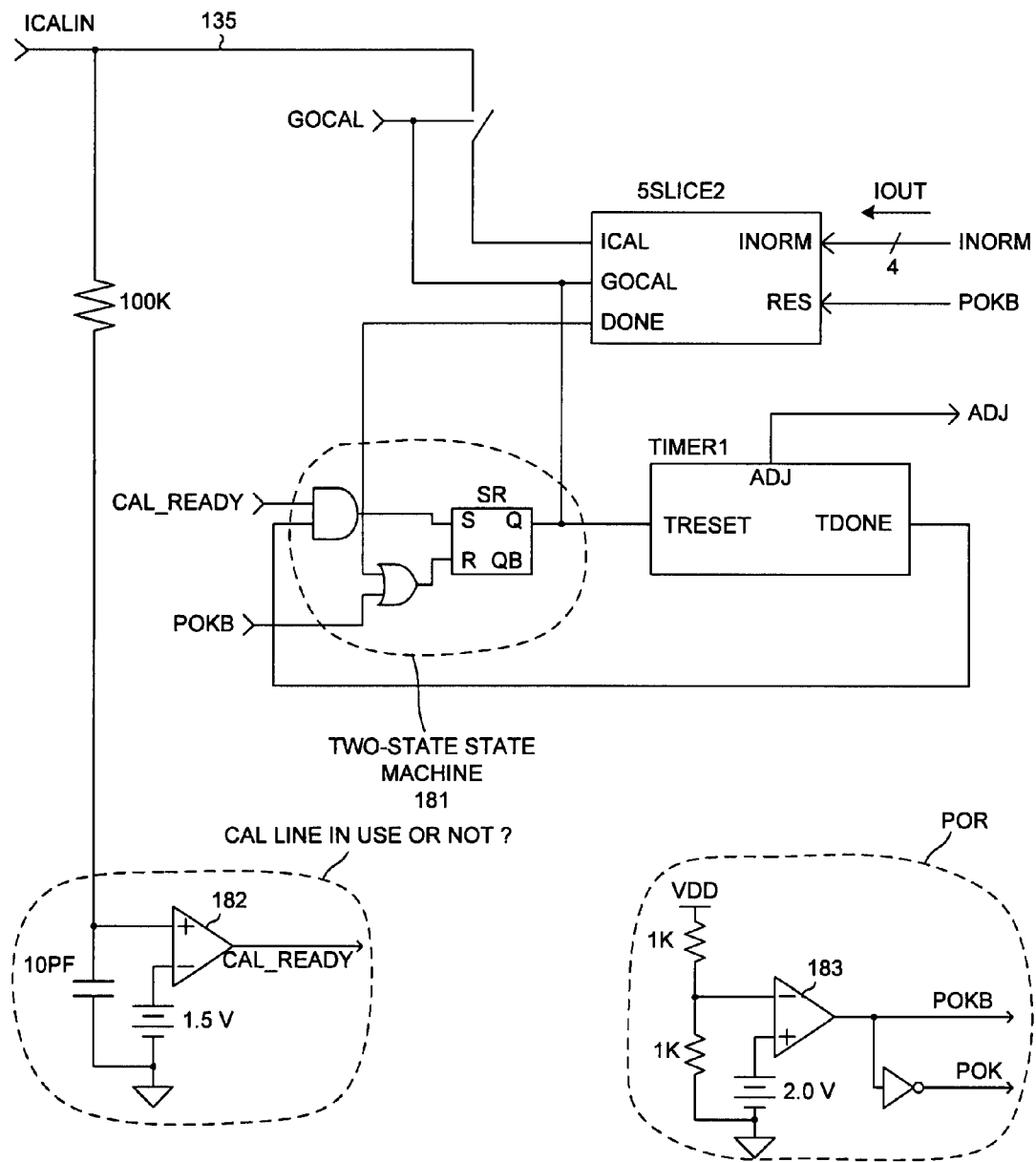
FIG. 30 is a diagram of one of the three integrated circuits of FIG. 29.

FIG. 30 is a diagram of one of the three integrated circuits of FIG. 29. The circuitry involves a two-state state machine 181 that is realized using only one flip-flop. A comparator 182 is provided that senses if the voltage on the reference current conductor 135 (received here on terminal ICALIN) is above a 1.5 volt threshold and if conductor 135 is available for calibration. If conductor 135 is detected to be available, then the signal CAL_READY is asserted to a digital logic high level. Another comparator 183 is provided to detect a power-on-reset condition (POR) in order that state machine 181 can be reset. A timer labeled TIMER1 determines an interval at which the current source calibration attempts are made. The actual CSC itself is the block labeled 5SLICE2. The 5SLICE2 block is described above in connection with FIGS. 22 and 25.

Although certain specific embodiments are described above for instructional purposes, the teachings of this patent document have general applicability and are not limited to the specific embodiments described above. The disclosed structures and methods are used in some applications to calibrate a plurality of programmable CSCs one by one, where the IOUT currents sinked/sourced by the programmable CSCs are not used to drive LEDs. Although voltage threshold levels are described above as ways to communicate information back and forth across the single reference current conductor, other suitable signaling techniques can be employed. For example, high speed digital signals can be superimposed on lower frequency IOUT signals on the reference current conductor, and the various programmable CSCs and/or integrated circuits of programmable CSCs can be made both to transmit those high frequency signals onto the reference current conductor and also to detect such frequency signals on the reference current conductor. Rather than using a single reference current conductor both for reference current supply purposes and for signaling purposes, each integrated circuit can include an additional terminal or terminals that are usable for signaling purposes. If such additional terminals are provided, then the signaling of information between integrated circuits of programmable CSCs can be communicated through a separate signal conductor coupled to these additional terminals and not across the reference current conductor. Although systems are described above in which a positive IREF current is supplied to CSCs, opposite polarity (negative IREF current) systems are possible in which the polarities of the predetermined characteristics being detected are flipped. Accordingly, various modifications, adaptations, and combinations of various features of the described embodiments can be practiced without departing from the scope of the invention as set forth in the claims.

What is claimed is:

1. A method comprising:
   (a) providing a plurality of current source circuits (CSCs) and a plurality of strings of light emitting diodes (LEDs), wherein each CSC is coupled to supply a current through a corresponding one of the strings of LEDs, wherein some of the CSCs are part of a first integrated circuit and others of the CSCs are part of a second integrated circuit;
   (b) serially calibrating the plurality of CSCs to a single reference signal, wherein the serially calibrating involves:
      (b1) during a first time period calibrating a first of the CSCs of the first integrated circuit, wherein the single reference signal is a reference current signal, and wherein during the first time period the reference current signal is supplied from an external source, through a conductor, onto the first integrated circuit; and
      (b2) during a second time period calibrating a second of the CSCs of the second integrated circuit, and wherein during the second time period the reference current signal is supplied from the external source, through the conductor, onto the second integrated circuit, wherein the conductor is coupled to both the first and second integrated circuits;
   (c) determining on the second integrated circuit whether a voltage on the conductor has a predetermined characteristic; and
   (d) if the voltage is determined in (c) to have the predetermined characteristic then initiating said calibrating of the second of the CSCs of the second integrated circuit.

2. The method of claim 1, wherein the serially calibrating of (b) involves repeatedly and automatically calibrating all the CSCs of the first and second integrated circuit in a fixed and unchanging order.

3. The method of claim 1, wherein the serially calibrating of (b) involves repeatedly and automatically calibrating all the CSCs of the first and second integrated circuit in an order that changes over time.

4. The method of claim 1, further comprising:
   using the plurality of strings of LEDs to backlight a display.

5. The method of claim 1, wherein each current source circuit (CSC) of the first integrated circuit includes a first programmable current source and a second programmable current source, and wherein the first integrated circuit includes a switching circuit, wherein during a calibration of the first programmable current source the switching circuit couples the second programmable current source to an associated one of the strings of LEDs such that an LED current flowing through said one string of LEDs flows through the second programmable current source and does not flow through the first programmable current source, and wherein during a calibration of the second programmable current source the switching circuit couples the first programmable current source to said one string of LEDs such that the LED current flowing through said one string flows through the first programmable current source and does not flow through the second programmable current source.

6. The method of claim 1,
   wherein during the first time period, the second of the CSCs of the second integrated circuit is not being calibrated, and wherein during the second time period, the first of the CSCs of the first integrated circuit is not being calibrated.

7. An integrated circuit, comprising:
   a reference terminal;
   a plurality of current source circuits (CSCs), wherein each CSC is coupled to the reference terminal and includes a programmable current source, wherein if a signal on the reference terminal has a predetermined characteristic at a predetermined time then said each CSC uses a reference current received onto the reference terminal to calibrate its programmable current source; and
   a plurality of current source terminals, wherein the programmable current source in each CSC is coupled to a respective one of the current source terminals.

8. The integrated circuit of claim 7, wherein each of the plurality of current source terminals is coupled to a respective one of a plurality of strings of light emitting diodes (LEDs).

9. The integrated circuit of claim 7, wherein each of the CSC further comprises a timer, wherein the timer of a CSC determines the predetermined time.

10. The integrated circuit of claim 7, wherein the programmable current sources of the CSCs are calibrated one by one in an order that changes over time.

11. The integrated circuit of claim 7, wherein the signal is a reference current signal.

12. The integrated circuit of claim 7, wherein the predetermined characteristic is a non-transient voltage level that is maintained for at least a predetermined amount of time.

13. An integrated circuit, comprising:
a reference terminal;
a plurality of current source circuits (CSCs), wherein each CSC includes a programmable current source;
a plurality of current source terminals, wherein the programmable current source in each CSC is coupled to a respective one of the current source terminals; and
circuitry that monitors a signal on the reference terminal and detects if the signal has a predetermined characteristic at a time, and in response to detecting that the signal has the predetermined characteristic at the time causes each of the plurality of CSCs to use a reference current received onto the reference terminal to calibrate its programmable current source.

14. The integrated circuit of claim 13, wherein once the circuitry detects that the signal has the predetermined characteristic at the time the circuitry causes all of the CSCs on the integrated circuit to be calibrated using the reference current, and wherein during the calibrating of all of the CSCs the integrated circuit causes the signal on the reference terminal to have a second predetermined characteristic.

15. The integrated circuit of claim 13, wherein a reference current conductor is coupled to the reference terminal of the integrated circuit, wherein the predetermined characteristic is indicative of the reference current conductor not being used to calibrate any CSC of any integrated circuit coupled to the reference current conductor, and wherein a second predetermined characteristic is indicative of the reference current conductor being used to calibrate a CSC within an integrated circuit coupled to the reference current conductor.

16. A packaged integrated circuit comprising:
a reference terminal;
a plurality of programmable current sources;
a plurality of current source terminals, wherein each programmable current source is coupled to a respective one of the current source terminals; and
means for determining whether a signal on the reference terminal has a predetermined characteristic, and in response to determining that the signal has the predetermined characteristic the means causes each of the plurality of programmable current sources to be calibrated one at a time using a reference current received onto the reference terminal.

17. The packaged integrated circuit of claim 16, wherein once the means determines that the signal on the reference terminal has the predetermined characteristic and the means causes each of the plurality of programmable current sources to be calibrated using the reference current, the means causes the signal on the reference terminal to have a second predetermined characteristic during the calibrating of each of the plurality of programmable current sources.

18. The packaged integrated circuit of claim 16, wherein a reference current conductor is coupled to the reference terminal of the packaged integrated circuit, wherein the predetermined characteristic is indicative of the reference current conductor not being used to calibrate any programmable current source of any integrated circuit coupled to the reference current conductor, and wherein a second predetermined characteristic is indicative of the reference current conductor being used to calibrate a programmable current source within an integrated circuit coupled to the reference current conductor.

19. The integrated circuit of claim 13, further comprising:
a timer that determines the time at which the circuitry detects if the signal has the predetermined characteristic.

20. The packaged integrated circuit of claim 16, further comprising:
a timer that determines a predetermined time at which the means determines whether the signal on the reference terminal has the predetermined characteristic.

* * * * *